US008650950B2

(12) United States Patent
Van Kann

(10) Patent No.: US 8,650,950 B2

(45) Date of Patent: Feb. 18, 2014

(54) DETECTOR FOR DETECTING A GRAVITY GRADIENT

(75) Inventor: Frank Joachim Van Kann, Nedlands (AU)

(73) Assignee: Technological Resources Pty, Ltd., Melbourne, Victoria (AU)

( * ) Notice: Subject to any disclaimer, the term of this patent is extended or adjusted under 35 U.S.C. 154(b) by 399 days.

(21) Appl. No.: 13/001,996

(22) PCT Filed: Sep. 25, 2009

(86) PCT No.: PCT/AU2009/001281

§ 371 (c)(1), (2), (4) Date: May 2, 2011

(87) PCT Pub. No.: WO2010/034074

PCT Pub. Date: Apr. 1, 2010

(65) Prior Publication Data

US 2011/0265563 A1 Nov. 3, 2011

(30) Foreign Application Priority Data

Sep. 25, 2008 (AU) ................................ 2008904997

(51) Int. Cl.

*G01V 7/00* (2006.01)

(52) U.S. Cl.

USPC .................... 73/382 G; 33/366.11; 33/366.13

(58) Field of Classification Search

USPC ............ 73/382 G, 382 R; 33/366.11, 366.13, 33/366.25, 366.26

See application file for complete search history.

(56) References Cited

U.S. PATENT DOCUMENTS 2,809,524 A * 10/1957 Masterson .................. 73/382 R
3,545,266 A * 12/1970 Wilson ....................... 73/152.54

(Continued)

FOREIGN PATENT DOCUMENTS

CA 2 478 504 9/2003
CA 2.427 115 10/2004

(Continued)

OTHER PUBLICATIONS

M. V. Moody ("A superconducting gravity gradiometer for measurements from a moving vehicle", AIP Review of Scientific Instruments, 2011).*

(Continued)

*Primary Examiner* — Peter Macchiarolo
*Assistant Examiner* — Samir M Shah
(74) *Attorney, Agent, or Firm* — Banner & Witcoff, Ltd.

(57) ABSTRACT

The present disclosure provides a gravity gradiometer for detecting a gravity gradient. The gravity gradiometer comprises at least two sensor masses that are pivotable about respective axes and each experience a change in torque in response to a change in gravity gradient whereby the at least two sensor masses move relative to each other in response to the change in gravity gradient and wherein a signal indicative of the gravity gradient is generated in response to the relative movement of the at least two sensor masses. Further, the gravity gradiometer comprises an acceleration sensor for sensing an acceleration associated with an external acceleration applied to the gravity gradiometer. The gravity gradiometer also comprises an actuator for generating an adjustment force that is dependent on an acceleration sensed by the acceleration sensor. The adjustment force is also dependent on a mechanical response parameter associated with at least one of the at least two sensor masses. The adjustment force is applied such that a difference between the magnitudes of the torques experienced by the at least two sensor masses in response to the change in gravity gradient is reduced.

26 Claims, 21 Drawing Sheets

700 721
pump lead
heat switch 704
$i_0$
702
$L_F$ spring coil
ballast coil $L_B$
706
pump lead
x-accelerometer
722 724
sense coils
726
723
728
y-accelerometer

(56) References Cited

U.S. PATENT DOCUMENTS 3,722,288 A 3/1973 Weber
3,926,054 A * 12/1975 Buck .......................... 73/382 R
4,497,206 A 2/1985 Scheurenbrand
4,513,618 A 4/1985 Lautzenhiser
4,841,772 A * 6/1989 Paik .......................... 73/382 G
4,935,883 A 6/1990 Hulsing, II et al.
4,992,656 A * 2/1991 Clauser .......................... 250/251
5,333,095 A 7/1994 Stevenson et al.
5,505,555 A 4/1996 Van Kann et al.
5,587,526 A 12/1996 Lumley et al.
5,668,315 A * 9/1997 Van Kann et al. .......... 73/382 G
5,728,935 A * 3/1998 Czompo .................... 73/382 G
5,777,226 A 7/1998 Ip
5,791,598 A * 8/1998 Rodden et al. ............... 244/165
5,804,722 A * 9/1998 Van Kann et al. .......... 73/382 G
5,817,939 A * 10/1998 Lumley et al. ............. 73/382 R
5,922,951 A * 7/1999 O'Keefe et al. ............ 73/382 G
5,962,781 A * 10/1999 Veryaskin .................. 73/382 G
6,082,194 A * 7/2000 Gladwin .................... 73/382 G
6,125,698 A * 10/2000 Schweitzer et al. ........ 73/382 G
6,212,952 B1 * 4/2001 Schweitzer et al. ........ 73/382 G
6,494,091 B2 * 12/2002 Couture .................... 73/382 R
6,526,825 B2 * 3/2003 Manson ..................... 73/382 R
6,612,171 B1 * 9/2003 Stephenson et al. ........ 73/382 R
6,615,660 B1 * 9/2003 Feinberg et al. ........... 73/382 R
6,658,935 B1 * 12/2003 Feinberg .................... 73/382 G
6,668,646 B1 * 12/2003 Davies et al. .............. 73/382 R
6,799,459 B2 * 10/2004 Dosch et al. ............... 73/382 G
6,837,106 B2 * 1/2005 Etkin et al. ................ 73/382 G
6,883,372 B2 * 4/2005 van Leeuwen et al. ..... 73/382 G
7,181,967 B2 * 2/2007 Lee ........................... 73/382 G
7,305,879 B2 * 12/2007 Moody et al. .............. 73/382 R
7,360,419 B2 * 4/2008 French et al. .............. 73/382 G
7,444,867 B2 * 11/2008 Brett et al. ................ 73/382 R
7,559,149 B2 * 7/2009 Van Kann .................. 33/366.25
7,562,460 B2 * 7/2009 Van Kann et al. ......... 33/366.25
7,562,461 B2 * 7/2009 Van Kann .................. 33/366.25
7,571,547 B2 * 8/2009 Van Kann et al. ......... 33/366.25
7,581,327 B2 * 9/2009 Van Kann et al. ......... 33/366.25
7,584,544 B2 * 9/2009 Van Kann et al. ......... 33/366.25
7,596,876 B2 * 10/2009 Van Kann .................. 33/366.25
7,624,635 B2 * 12/2009 Van Kann et al. .......... 73/382 R
7,627,954 B2 * 12/2009 Van Kann et al. ......... 33/366.24
7,637,153 B2 * 12/2009 Van Kann et al. .......... 73/382 G
7,714,584 B2 * 5/2010 Van Kann ..................... 324/330
7,784,343 B2 * 8/2010 Van Kann et al. .......... 73/382 G
7,788,974 B2 * 9/2010 Van Kann et al. .......... 73/382 R
7,788,975 B2 * 9/2010 Brett et al. ................. 73/382 R
7,814,790 B2 * 10/2010 Van Kann ................... 73/382 G
7,823,448 B2 * 11/2010 Van Kann et al. .......... 73/382 G
7,823,449 B2 * 11/2010 Van Kann et al. .......... 73/382 G
7,849,739 B2 * 12/2010 Van Kann et al. .......... 73/382 G
7,938,003 B2 * 5/2011 Van Kann et al. .......... 73/382 G
7,942,054 B2 * 5/2011 Van Kann et al. .......... 73/382 G
7,975,544 B2 * 7/2011 Van Kann et al. .......... 73/382 G
7,980,130 B2 * 7/2011 Kann et al. .................. 73/382 G
8,033,170 B2 * 10/2011 Van Kann ................... 73/382 G
8,069,725 B2 * 12/2011 Moody .......................... 73/383
8,074,515 B2 * 12/2011 Van Kann et al. .......... 73/382 G
8,201,448 B2 * 6/2012 French et al. ................... 73/383
8,230,737 B2 * 7/2012 Cao ............................ 73/382 R
8,359,920 B2 * 1/2013 Meyer ......................... 73/382 G
8,375,785 B2 * 2/2013 Metzger et al. ............. 73/382 G
2002/0092350 A1 * 7/2002 Etkin et al. ................ 73/382 G
2003/0033086 A1 * 2/2003 Lee et al. .......................... 702/5
2003/0209070 A1 * 11/2003 Dosch et al. ............... 73/382 G
2004/0211255 A1 * 10/2004 Leeuwen et al. ........... 73/382 G
2005/0116717 A1 * 6/2005 Dransfield et al. ............ 324/331
2005/0126287 A1 6/2005 Malametz
2005/0160815 A1 * 7/2005 Lee .......................... 73/514.15
2005/0211255 A1 9/2005 Matsuoka
2005/0236909 A1 * 10/2005 Baker ............................ 310/10
2006/0117848 A1 * 6/2006 Raffalt ........................... 73/313
2006/0156810 A1 * 7/2006 Brett et al. .................. 73/382 G
2006/0207326 A1 * 9/2006 Moody et al. ............... 73/382 R
2006/0277993 A1 * 12/2006 Wang et al. ..................... 73/383
2007/0051175 A1 3/2007 French et al.
2008/0115374 A1 * 5/2008 Van Kann et al. ......... 33/366.11
2008/0115375 A1 * 5/2008 Van Kann .................. 33/366.25
2008/0115376 A1 * 5/2008 Van Kann .................. 33/366.25
2008/0115377 A1 * 5/2008 Van Kann .................. 33/366.25
2008/0115578 A1 * 5/2008 Van Kann et al. .......... 73/382 G
2008/0116905 A1 * 5/2008 Van Kann ..................... 324/686
2008/0120858 A1 * 5/2008 Van Kann et al. ......... 33/366.25
2008/0121035 A1 * 5/2008 Van Kann et al. .......... 73/382 G
2008/0121036 A1 * 5/2008 Van Kann et al. .......... 73/382 G
2008/0121037 A1 * 5/2008 Van Kann et al. .......... 73/382 G
2008/0122435 A1 * 5/2008 Van Kann et al. ....... 324/207.15
2008/0163682 A1 * 7/2008 Van Kann et al. .......... 73/382 G
2008/0173090 A1 * 7/2008 Van Kann et al. .............. 73/383
2008/0236277 A1 * 10/2008 Van Kann et al. .......... 73/382 G
2008/0257038 A1 * 10/2008 Van Kann et al. .......... 73/382 G
2008/0282796 A1 * 11/2008 Van Kann et al. .......... 73/382 G
2008/0302179 A1 * 12/2008 Van Kann et al. .......... 73/382 G
2008/0302180 A1 * 12/2008 Van Kann et al. .......... 73/382 G
2008/0307883 A1 * 12/2008 Van Kann et al. .......... 73/382 G
2009/0044621 A1 * 2/2009 Brett et al. .................. 73/382 R
2009/0260433 A1 * 10/2009 Van Kann et al. .............. 73/383
2009/0293611 A1 * 12/2009 Van Kann et al. .......... 73/382 R
2010/0005882 A1 * 1/2010 Van Kann ................... 73/382 G
2010/0071462 A1 * 3/2010 Van Kann ................... 73/382 R
2010/0095765 A1 * 4/2010 Van Kann et al. .......... 73/382 G
2010/0095766 A1 * 4/2010 Van Kann et al. .......... 73/382 G
2010/0107756 A1 * 5/2010 Van Kann et al. .......... 73/382 G
2010/0154536 A1 * 6/2010 Van Kann et al. .......... 73/382 G
2010/0154537 A1 * 6/2010 Van Kann et al. .......... 73/382 G
2011/0138909 A1 6/2011 Van Kann
2011/0162449 A1 * 7/2011 Van Kann ................... 73/382 G
2011/0265563 A1 11/2011 Van Kann

FOREIGN PATENT DOCUMENTS

EP 0 200 958 12/1986
WO WO-02/44757 A2 6/2002
WO WO 03/076970 9/2003
WO WO-2007/038818 A1 4/2007
WO WO-2007/038825 A1 4/2007
WO WO-2008/061278 A1 5/2008

OTHER PUBLICATIONS

Mark Helm Dransfield ("Airborne Gravity Gradiometry", The University of Western Australia, Department of Physics, 1994).*

F J van Kann ("An Airborne Cryogenic Gravity Gradiometer for Geophysical Exploration", The University of Western Australia, Department of Physics, May 1992).*

M. Vol Moody et al. ("Three-axis superconducting gravity gradiometer for sensitive gravity experiments", Review of Scientific Instruments, vol. 73, No. 11, Nov. 2002).*

Bent Ziegler et al. ("Drag-Free Motion Control of Satellite for High-Precision Gravity Field Mapping", Proceedings of the 2002 IEEE International Conference on Control Applications, Technical University of Denmark, Sep. 18-20 2002).*

P Touboul et al. ("The Microscope experiment, ready for the in-orbit test of the equivalence principle", Class Quantum Grav. 29 (2012), France, Aug. 15, 2012).*

International Search Report from the Australian Patent Office for International Application No. PCT/AU2009/001281 (Mail date Jan. 4, 2010).

M.V. Moody et al., "A Superconducting Gravity Gradiometer for Inertial Navigation, "Position Location and Navigation Symposium 2004, pp. 775-781 (Apr. 26-29, 2004).

International (PCT) Preliminary Report on Patentability in International Application No. PCT/AU2009/001280; Mailing Date: Mar. 29, 2011.

International (PCT) Preliminary Report on Patentability in International Application No. PCT/AU2009/001282; Mailing Date: Nov. 25, 2010.

* cited by examiner

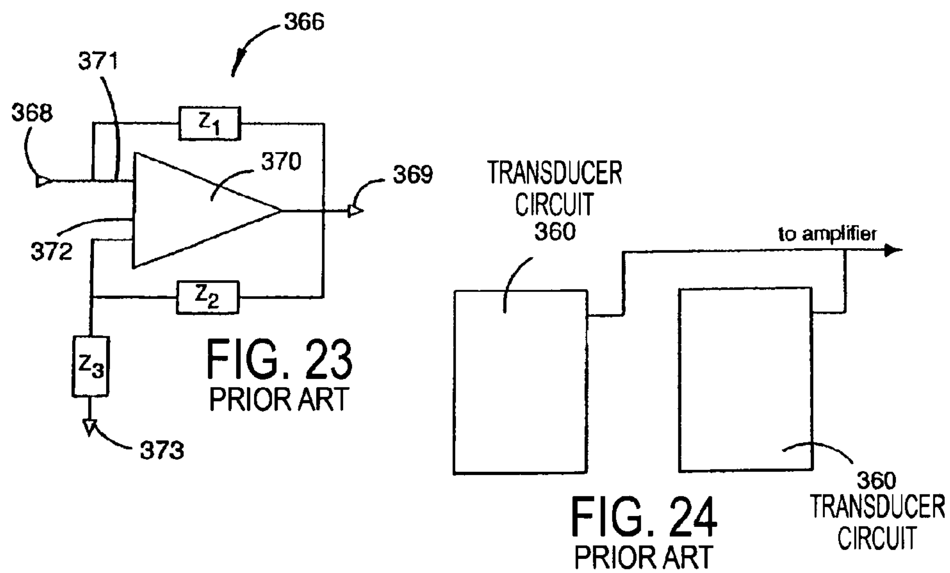
FIG. 23
PRIOR ART
FIG. 24
PRIOR ART
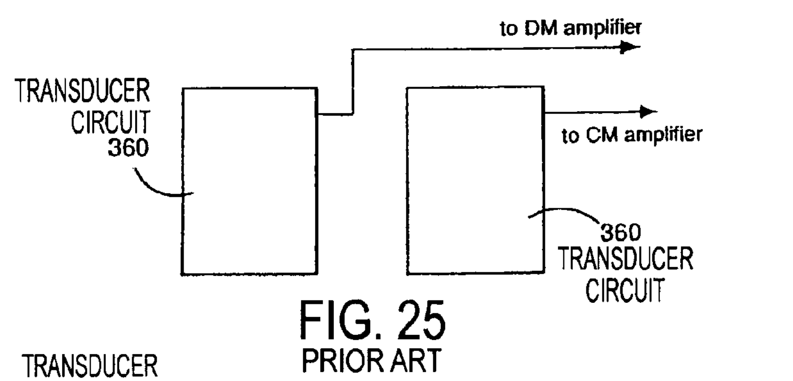
FIG. 25
PRIOR ART
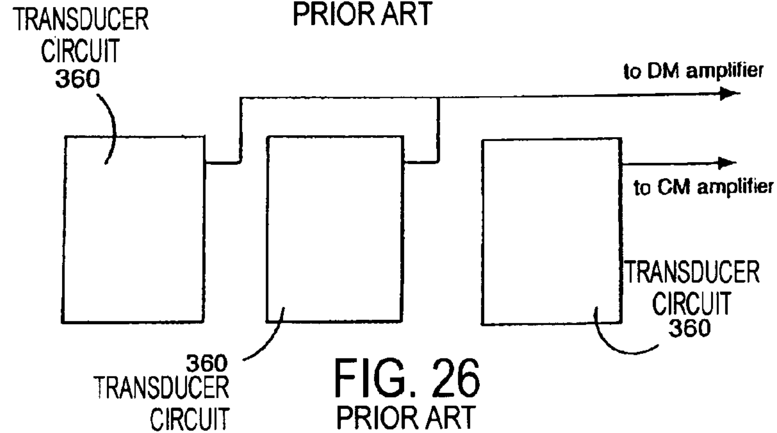
FIG. 26
PRIOR ART

DETECTOR FOR DETECTING A GRAVITY GRADIENT

CROSS REFERENCE TO RELATED APPLICATION

This application is a national phase application based on PCT/AU2009/001281, filed Sep. 25, 2009, which claims the priority of Australian Patent Application No. 2008904997, filed Sep. 25, 2008, the content of both of which is incorporated herein by reference.

FIELD OF THE INVENTION

The present invention relates to a detector for detecting a gravity gradient and a gravity gradiometer.

BACKGROUND OF THE INVENTION

Gravimeters are used in geological exploration to measure the first derivatives of the earth's gravitational field. Whilst some advances have been made in developing gravimeters which can measure the first derivatives of the earth's gravitational field, because of the difficulty in distinguishing spatial variations of the field from temporal fluctuations of accelerations of a moving vehicle, these measurements can usually be made to sufficient precision for useful exploration only with land-based stationary instruments.

Gravity gradiometers (as distinct from gravimeters) are used to measure the second derivative of the gravitational field and use a sensor which is required to measure the differences between gravitational forces down to one part in $10^{12}$ of normal gravity.

A gravity gradiometer typically has a sensor in the form of at least one sensor mass that experiences a change in torque in response to a change in gravity gradient.

Gravity gradiometers have been used to attempt to locate deposits such as ore deposits including iron ore and geological structures bearing hydrocarbons. It would be convenient if gravity gradiometers could be positioned in aircrafts for such analyses. However, aircraft accelerations result in torques that are much larger that those associated with the gravity gradient. A reduction of an influence of such aircraft accelerations on the sensor provides a technological challenge.

SUMMARY OF THE INVENTION

The present invention provides in a first aspect A gravity gradiometer for detecting a gravity gradient, comprising:

- at least two sensor masses that are pivotable about respective axes and each experience a change in torque in response to a change in gravity gradient whereby the at least two sensor masses move relative to each other in response to the change in gravity gradient and wherein a signal indicative of the gravity gradient is generated in response to the relative movement of the at least two sensor masses;
- an acceleration sensor for sensing an acceleration associated with an external acceleration applied to the gravity gradiometer; and
- an actuator for generating an adjustment force that is dependent on an acceleration sensed by the acceleration sensor, the adjustment force being also dependent on a mechanical response parameter associated with at least one of the at least two sensor masses and the adjustment force being applied such that a difference between the magnitudes of the torques experienced by the at least two sensor masses in response to the change in gravity gradient is reduced.

The mechanical response parameter may be dependent on a mechanical responsiveness of the at least one sensor mass to an applied force. In one embodiment the mechanical response parameter is dependent on a magnitude of a mass dipole moment of the at least one sensor mass of the at least two sensor masses.

The actuator and the acceleration sensor may form a part of a feed-forward control arrangement for controlling the adjustment force.

In one example the acceleration sensor is arranged to sense a linear acceleration.

The pivot may be a flexure web.

The mechanical response parameter associated with at least one of the at least two sensor masses may be dependent on a distance between a centre of mass and the respective axis of rotation of the at least one sensor mass. The centre of mass of each sensor mass may be located in the proximity of the respective axes and at least a portion of the difference between the torques experienced by the sensor masses may be a consequence of different locations of the centres of mass relative to the respective axis.

The respective axes may be aligned so as to be coaxial.

Each sensor mass may have a centre of mass that is displaced from the respective axis of rotation by a distance that is less than 1 part in $10^6$, less than one part in $5\times10^6$ or even less than one part in $10^7$ of a of a radius of gyration of the sensor mass.

The centre of mass of each sensor mass is located within 5 nm of the respective axis.

The at least two sensor masses may be pivotable within one plane and the gravity gradiometer may be arranged so that a difference between the torques experienced by the at least two sensor masses in response to the change in gravity gradient is reduced for an acceleration applied in any direction within the plane.

At least a portion of the acceleration sensor may be located at a fixed location relative to one of the at least two sensor masses.

The gravity gradiometer may comprise capacitors that are arranged such that the relative movement of the at least two sensor masses generates an electrical signal in the capacitors.

Alternatively, the gravity gradiometer may comprise inductive coils that are arranged such that the relative movement of the at least two sensor masses generates an electrical signal in the inductive coils. The at least two sensor masses may be positioned in a Dewar and the gravity gradiometer may comprise superconducting components that in use operate at cryogenic temperatures.

The gravity gradiometer may comprise a stabilisation platform and the acceleration sensor may be located on a payload side of the stabilisation platform The present invention provides in a second aspect a method of detecting a gravity gradient signal using a detector comprising at least two sensor masses that are movable and each experience a change in torque in response to a change in gravity gradient whereby the at least two sensor masses move relative to each other;

- determining an response parameter associated with at least one of the at least two sensor masses;
- sensing an acceleration associated with an external acceleration;
- generating an adjustment force that is applied such that a difference between the magnitudes of the torques experienced by the at least two sensor mass is reduced, the adjustment force being dependent on a sensed acceleration and a determined response parameter; and detecting the gravity gradient signal.

The external acceleration may be a linear acceleration and the response parameter may be dependent on a mass dipole moment of the at least one sensor mass.

The invention will be more fully understood from the following description of specific embodiments of the invention. The description is provided with reference to the accompanying drawings.

BRIEF DESCRIPTION OF THE DRAWINGS

FIG. 23 is a frequency tuning circuit according to an embodiment of the present invention;

FIGS. 24 to 26 show circuitry according to embodiments of the present invention;

DETAILED DESCRIPTION OF THE SPECIFIC EMBODIMENTS

Figure 1:
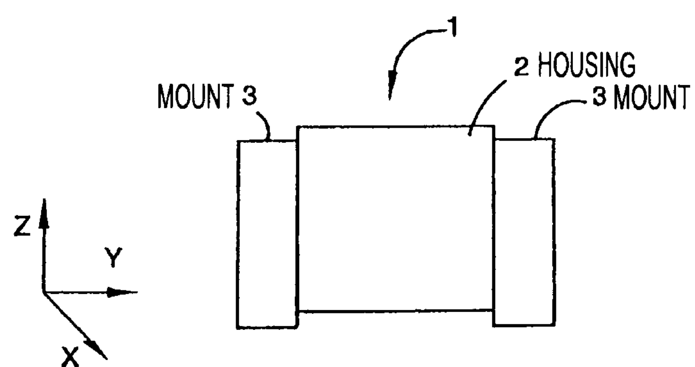
FIG. 1 is a schematic view of a gravity gradiometer according to a specific embodiment of the present invention.

FIG. 1 is a schematic view of a gravity gradiometer 1 according to a specific embodiment of the present invention. The gravity gradiometer 1 is arranged for vertical positioning relative to a ground plane. Throughout this specification the ground plane coincides with an x-y plane of an x, y, z-coordination system and the gravity gradiometer is in this embodiment arranged for rotation about the z-axis and oriented in a manner such that the $\Gamma_{xy}$ and $(\Gamma_{xx}-\Gamma_{yy})$ components of the gravity gradient tensor can be measured.

The function of the gravity gradiometer 1 may be briefly summarised as follows. The gravity gradiometer has in this embodiment two substantially identical sensor masses which are pivotally mounted on a mounting so that they can oscillate relative to the mounting. The sensor masses with mounting are rotated about the z-axis and with an angular frequency that approximately equals half the resonance frequency of sensor masses. A gravity gradient will result in a force on the sensor masses which will then oscillate relative to the mounting during that rotation. Components of the gravity gradient tensor can be determined from the oscillating movement of the sensor masses relative to each other. For further details on the general principal of such measurements are described in the applicants co-pending PCT international patent application number PCT/AU2006/001269.

The gravity gradiometer shown in FIG. 1 comprises a housing 2 which is connected to an external support structure 3 ("external platform"), which is positioned on a suspension comprising springs and dampers arranged to reduce an impact of an external linear acceleration having a frequency above a few Hz, such as 3, 5 or 10 Hz. The external platform 3 is arranged for rotation of the housing 2 at a suitable angular frequency about the z-axis. Further, the external platform 3 is arranged for adjusting an orientation of the housing 2 about three orthogonal axes. An internal support structure ("internal platform") comprises the sensor masses and is positioned within the housing 2. The internal platform is arranged for fine adjustment of the rotation about the z-axis in a manner such that transmission of an external angular acceleration about the z-axis to the sensor masses is further reduced. The resultant z-axis rotation, as experienced by the sensor masses, is of high precision and any remaining angular accelerations about or along the x- and y-axes are reduced electronically by processing a signal indicative of the gravity gradiometer generated by the gravity gradiometer 1.

The following will describe components and function of the gravity gradiometer 1 in detail.

Figure 2:
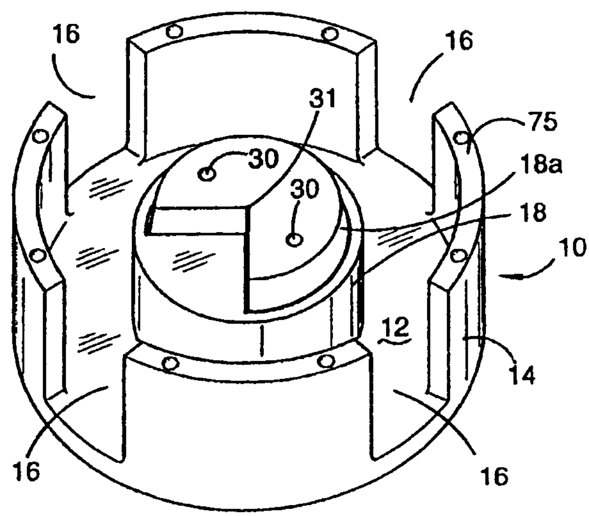
FIG. 2 is a perspective view of a first mount forming part of a mounting of the gravity gradiometer of according to the specific embodiment of the present invention.
Figure 5:
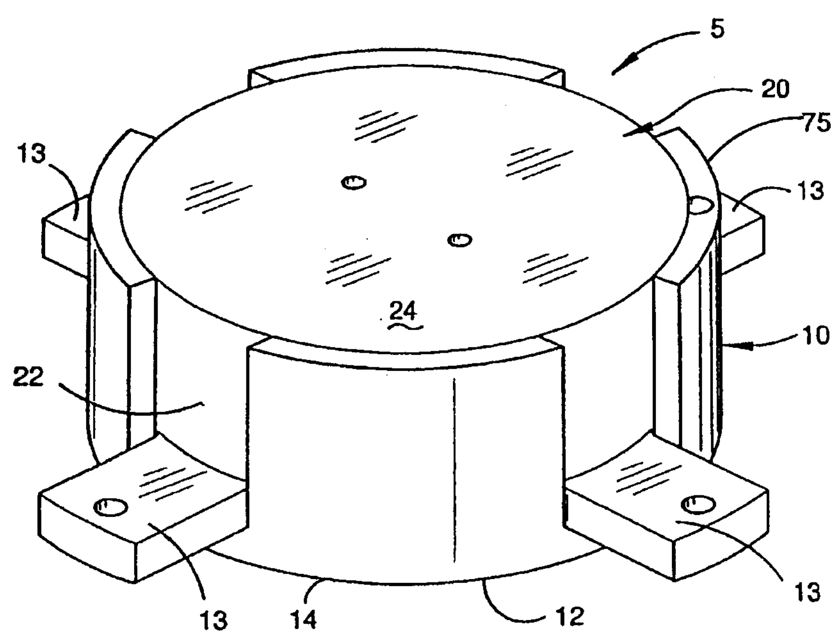
FIG. 5 is a view of the assembled structure.

With reference to FIG. 2, a first mount 10 is now described. The first mount 10 forms a part of rotatable mounting 5 which is shown in FIG. 5. The mount 10 comprises a base 12 and an upstanding peripheral wall 14. The peripheral wall 14 has a plurality of cut-outs 16. The base 12 supports a hub 18.

Figure 3:
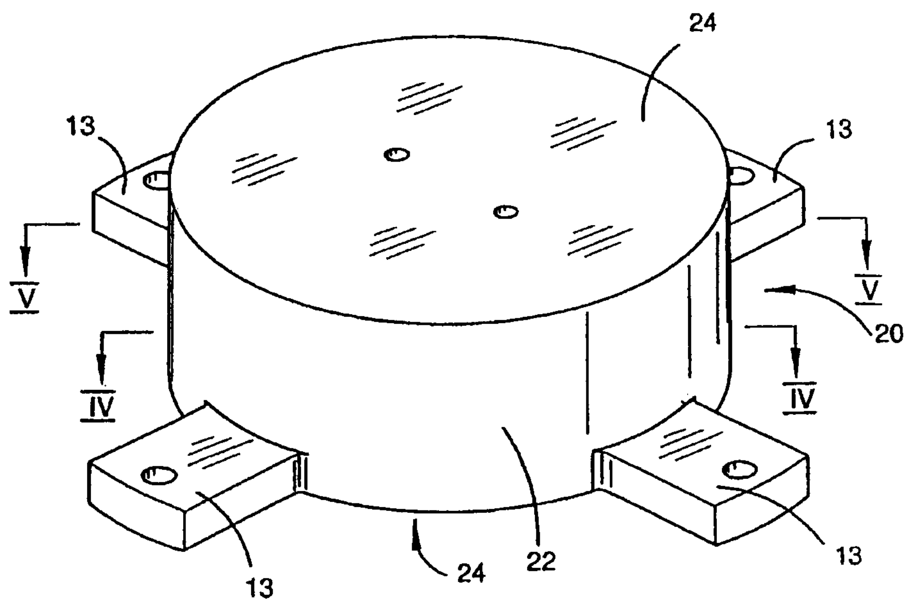
FIG. 3 is a perspective view of a second mount of the mounting according to a specific embodiment of the present invention.
Figure 4:
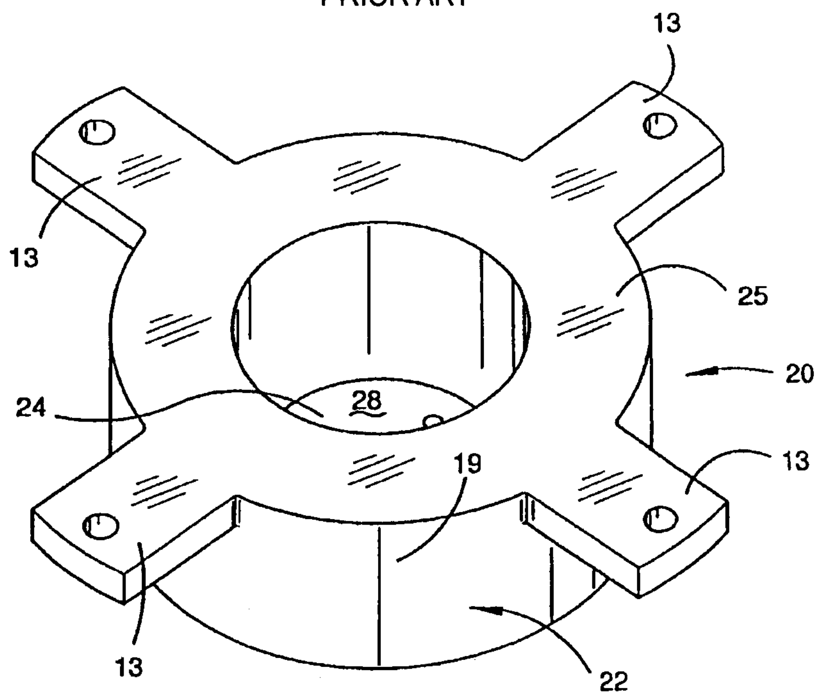
FIG. 4 is a perspective view from underneath the mount shown in FIG. 3.

FIGS. 3 and 4 show a second mount 20 which comprises a peripheral wall 22 and a top wall 24. The peripheral wall 22 has four lugs 13 for supporting the mounting 5 in the housing 2. The top wall 24 and the peripheral wall 22 define an opening 28. The second mount 20 is mounted on the first mount 10 by locating the hub 18 into the opening 28 and the lugs 13 through respective cut-outs 16 as is shown in FIG. 5.

The first mount 10 is joined to the second mount 20. The flexure web 31 is formed in the first mount 10 so that a primary mount portion of the mount 10 can pivot about a flexure web 31 relative to a secondary mount portion of the mount 10. This will be described in more detail with reference to the second embodiment shown in FIGS. 10 to 16.

The mounting 5 mounts the sensor 40 (which will be described in more detail hereinafter and which is typically in the form of a mass quadruple) for fine rotational adjustment about the z-axis for stabilising the gradiometer during the taking of measurements particularly when the gradiometer is airborne. As described above, rotational stabilisation about the x- and y-axis is in this embodiment provided by the external platform only. The gravity gradiometer 1 is arranged so that in use the mounting 5 is oriented parallel to the x-y plane.

Figure 6:
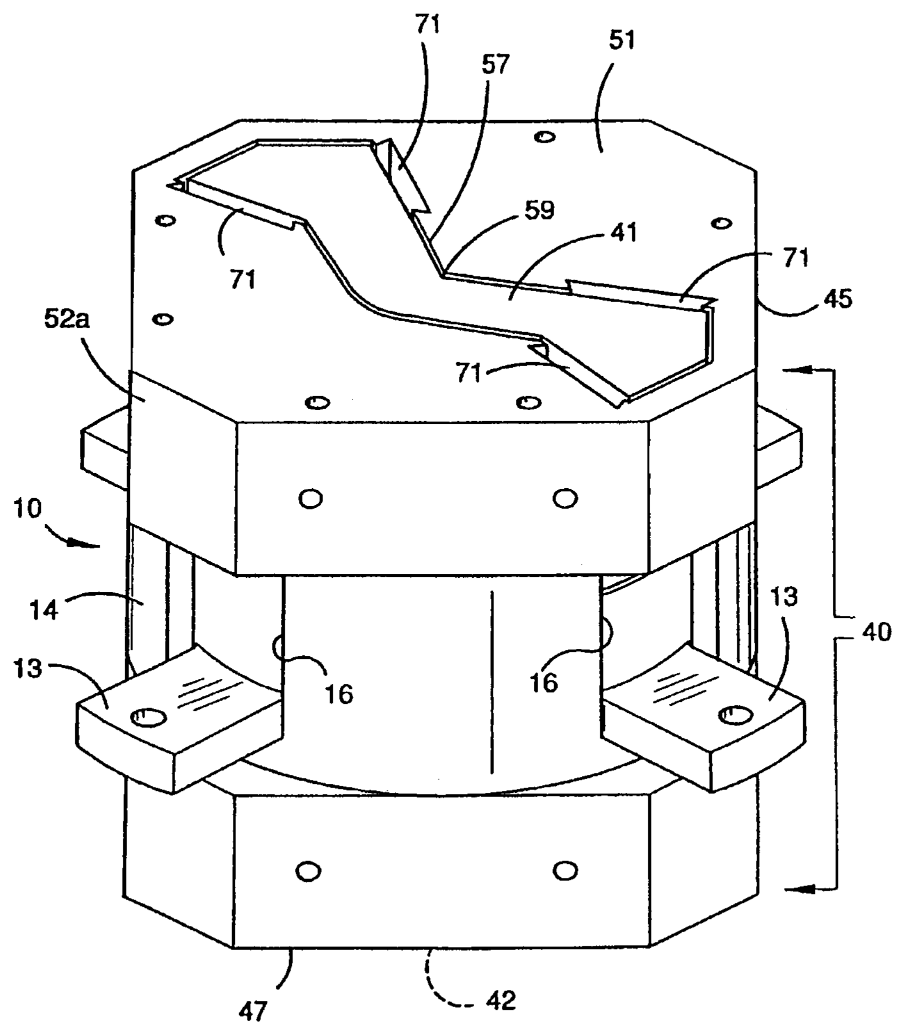
FIG. 6 is a perspective view showing assembled components of the gravity gradiometer according to another specific embodiment of the present invention.

FIG. 6 shows sensor 40 mounted on the mounting. The sensor 40 is an Orthogonal Quadruple Responder—OQR sensor formed of a first sensor mass and a second sensor mass in the form of a first sensor mass 41 and a second sensor mass 42 (not shown in FIG. 6) orthogonal to the sensor mass 41 and which is of the same shape as the sensor mass 41.

The sensor mass 41 is positioned in a first housing portion 45 and the sensor mass 42 is positioned in a second housing portion 47. The sensor mass 41 and the first housing portion 45 is the same as the sensor 42 and the second housing portion 47 except that one is rotated 90° with respect to the other so that the sensor masses 41 and 42 are orthogonal. Hence only the first housing portion 45 will be described.

Figure 7:
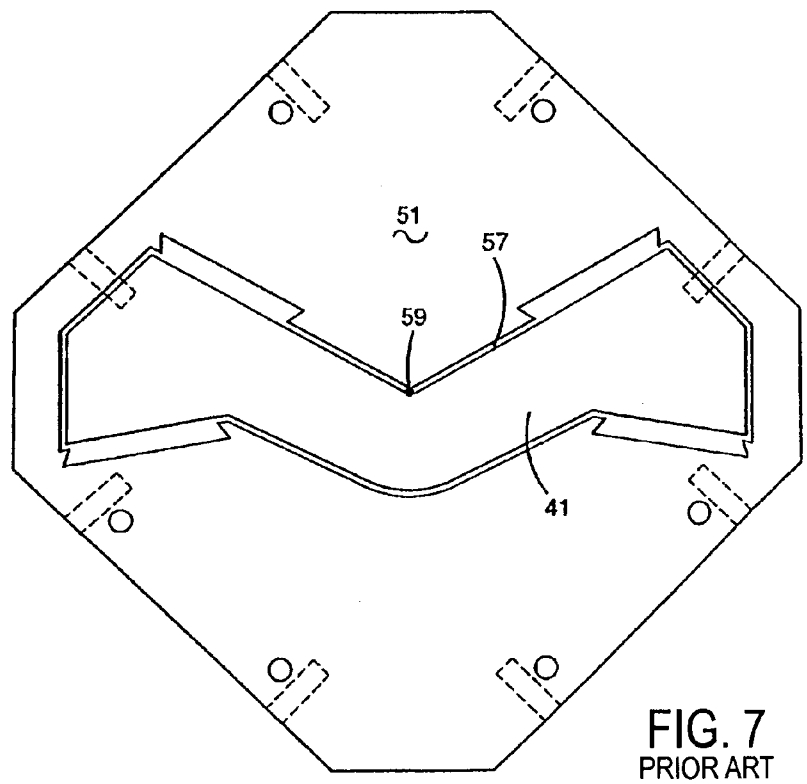
FIG. 7 is a plan view of a sensor mass according to a specific embodiment of the present invention.

The first housing portion 45 has an end wall 51 and a peripheral side wall 52*a*. The end wall 51 is connected to rim 75 (FIGS. 2 and 5) of the wall 14 of the first mount 10 by screws or the like (not shown). The sensor mass 41 is formed by a cut 57 in the wall 51 except for a second flexure web 59 which joins the sensor mass 41 to the wall 51. The second flexure 59 web is shown enlarged in the top view of the sensor mass 41 in FIG. 7. Thus, the sensor mass 41 is able to pivot in the x-y plane relative to the first housing portion 45 in response to changes in the gravitational field. The sensor mass 42 is mounted in the same way as mentioned above and also can pivot in the x-y plane relative to the second housing portion 47 in response to changes in the gravitational field about a third flexure web. The second housing portion 47 is connected to base 12 (FIG. 2) of the first mount 10.

The sensor mass 41 and the first housing portion 45 together with the second flexure web 59 are an integral monolithic structure.

Transducers 71 (not shown in FIGS. 2 to 4) are provided for measuring the movement of the sensor masses 41 and 42 and for producing output signals indicative of the relative movement in the x-y pane and therefore of the gravity gradient.

Figure 8:
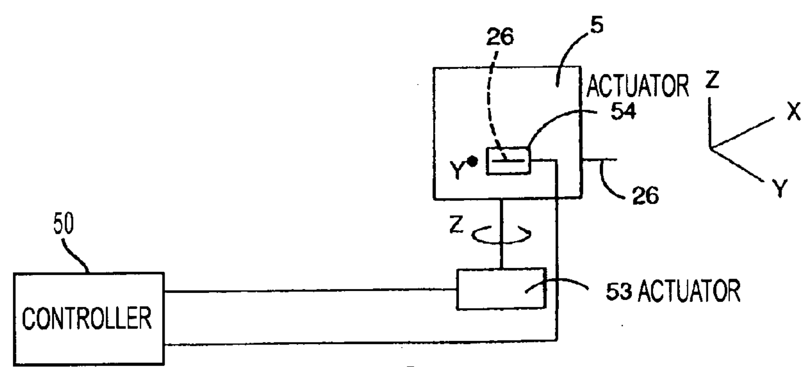
FIG. 8 is a diagram showing actuator control according to a specific embodiment of the present invention.

FIG. 8 is a schematic block diagram showing actuator control to stabilise the gradiometer by rotating the mounting 5 about the z-axis. A controller 50 which may be a computer, microprocessor or the like outputs signals to actuators 53 and 54, which are arranged to rotate the mounting 5 about the z-axis. Each actuator is positioned stationary relative to lugs 13 and coupled to the first mount 10 so that the actuator can effect a rotation by a small angle of the mount 10 with other components relative to the lugs 13 (and other components that are stationary relative to the lugs 13). Each actuator provides a linear movement and is positioned so that the linear movement is translated into a small rotation of the mount 10. The actuators will be described in more detail with reference to FIG. 27. The position of the mounting 5 is monitored so that appropriate feedback can be provided to the controller 50 and the appropriate control signals provided to the actuators to rotate the support 10 about the z-axis as is required to stabilise the support during movement through the air either within or towed behind an aircraft.

The specific embodiment also includes angular accelerometers which are similar in shape to the sensor masses 41 and 42 but the shape is adjusted for zero quadruple moment. The linear accelerometers are simple pendulous devices with a single micro pivot acting as the flexural hinge.

Figure 9:
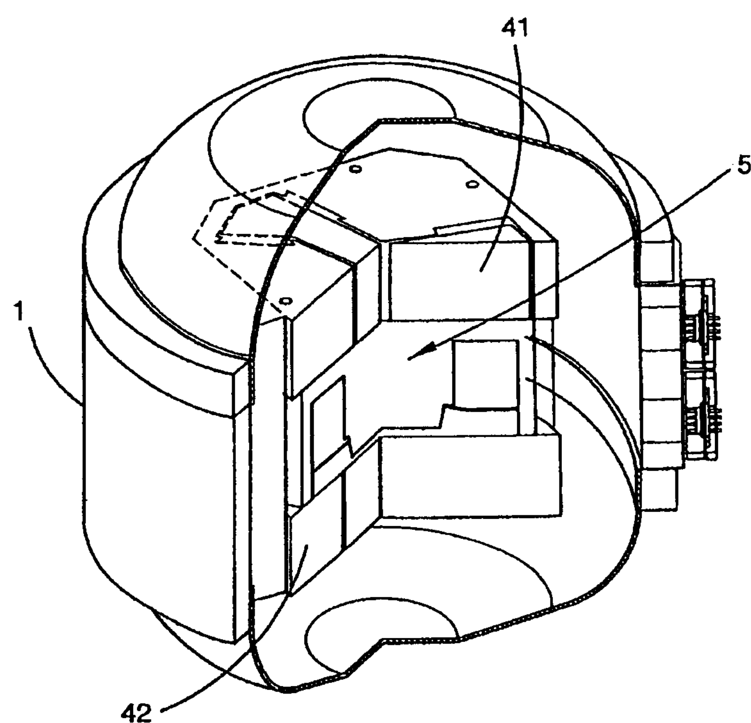
FIG. 9 is a perspective view of components of a gravity gradiometer according to a specific embodiment of the present invention.

FIG. 9 is a cut away view of components of the gravity gradiometer ready for mounting in the housing 1 which in turn is to be mounted in the external platform 2.

The transducers 71 measure the angle of displacement of the sensor masses 41 and 42 and control circuitry (not shown) is configured to measure the difference between them.

In this embodiment, the transducers 71 are constant charge capacitors, which will be described in more detail with reference to FIG. 22.

FIGS. 10 to 15 show a second embodiment in which like parts indicate like components to those previously described.

Figure 15:
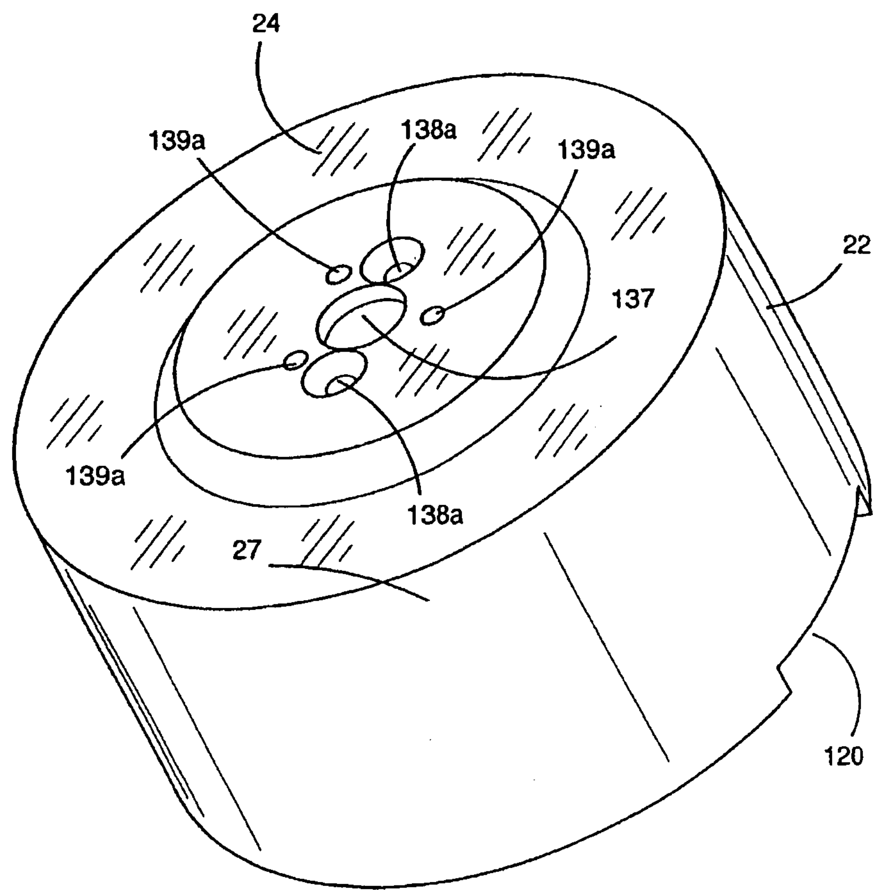
FIG. 15 is a perspective view of the second mount component of FIG. 14 from above.
Figure 16:
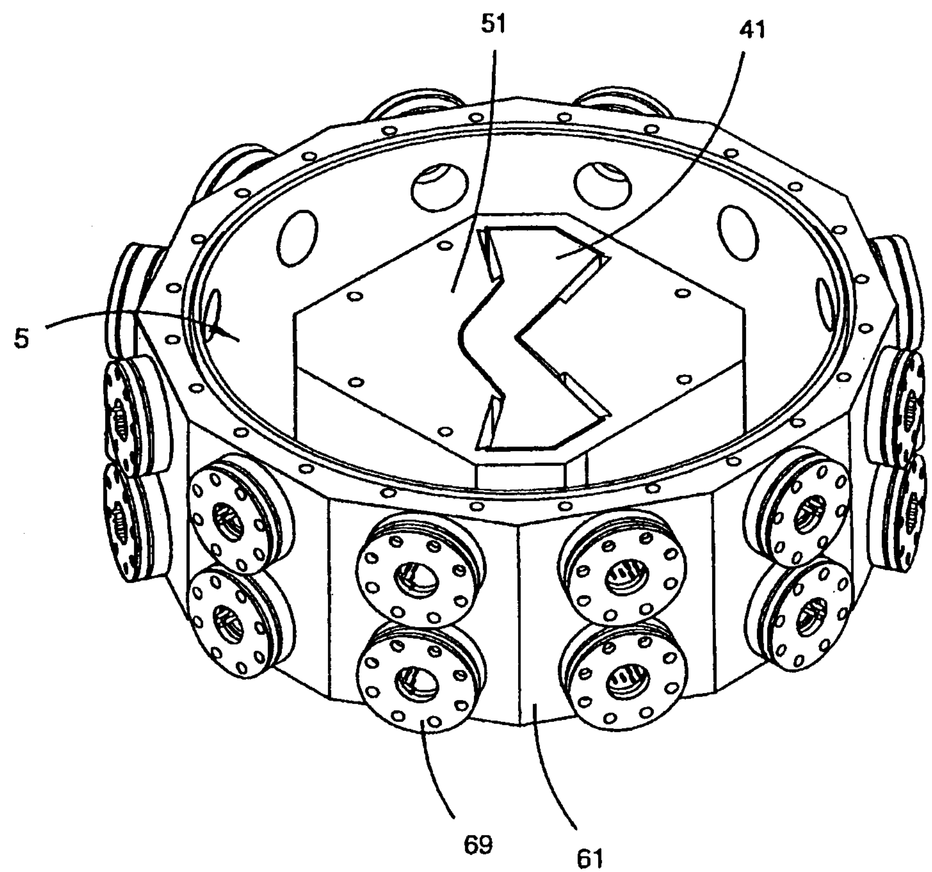
FIG. 16 is a perspective view of assembled components of the gravity gradiometer according to a specific embodiment of the present invention.

In the second embodiment the first mount 10 has cut-outs 80 which effectively form slots for receiving lugs (not shown) which are connected to the mount 10 in the cut-outs 80 and also to the second mount 20 shown in FIGS. 15 and 16. In this embodiment the lugs are separate components so that they can be made smaller, and more easily, made than being cut with the second mount section 20.

Figure 10:
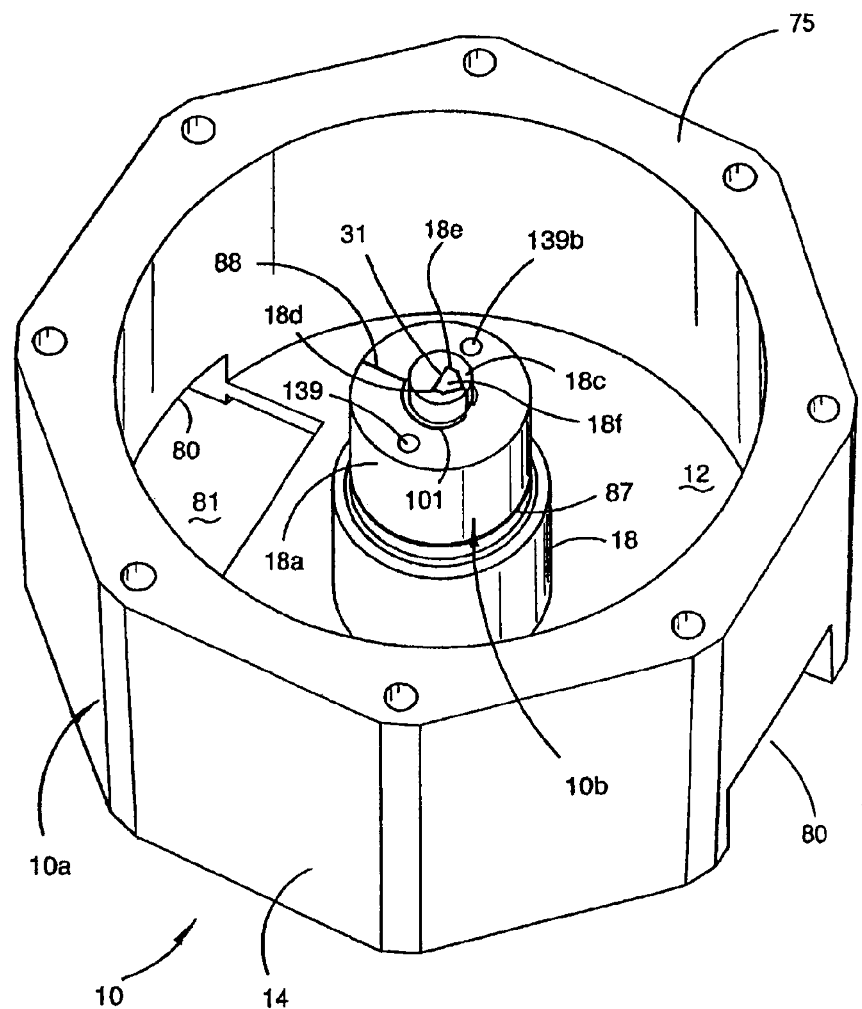
FIG. 10 is a perspective view of a first mount of a mounting according to another specific embodiment of the present invention.

In FIG. 10 a cut 87 is made to define the part 18*a* of the hub 18. The cut 87 then extends radially inwardly at 88 and then around central section 18*c* as shown by cut 101. The cut 101 then enters into the central section 18*c* along cut lines 18*d* and 18*e* to define a core 18*f*. The core 18*f* is connected to the central section 18*c* by the flexural web 31 which is an uncut part between the cut lines 18*e* and 18*d*. The part 10*a* therefore forms a primary mount portion of the mount 10 which is separated from a secondary mount portion 10*b* of the mount 10 except for where the portion 10*b* joins the portion 10*a* by the flexural web 31. The part 18*a* effectively forms an axle to allow for rotation of the part 18*a* relative to the part 10*a* in the z direction about the flexure web 31.

Figure 11:
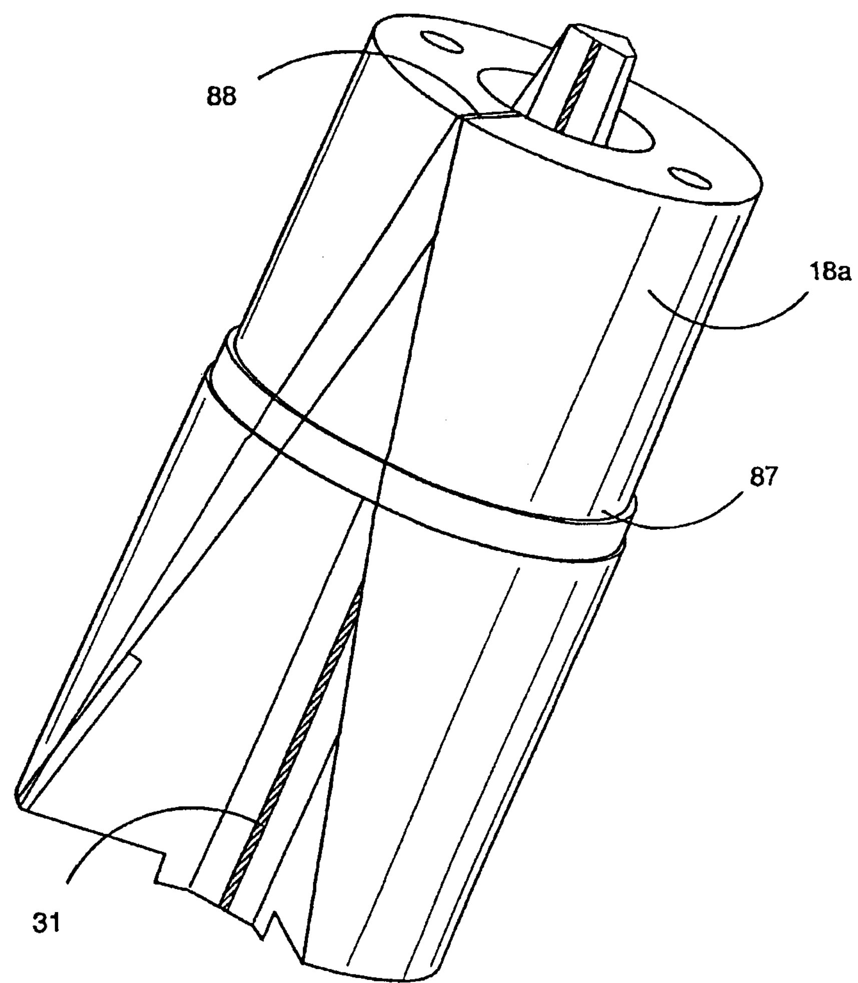
FIG. 11 is a perspective view of part of the mounting of FIG. 10 to illustrate the location and extent of the flexural web of the first mount.

As is shown in FIG. 11, the cut line 88 tapers outwardly from the upper end shown in FIG. 11 to the lower end and the core 18*c* tapers outwardly in corresponding shape.

Figure 12:
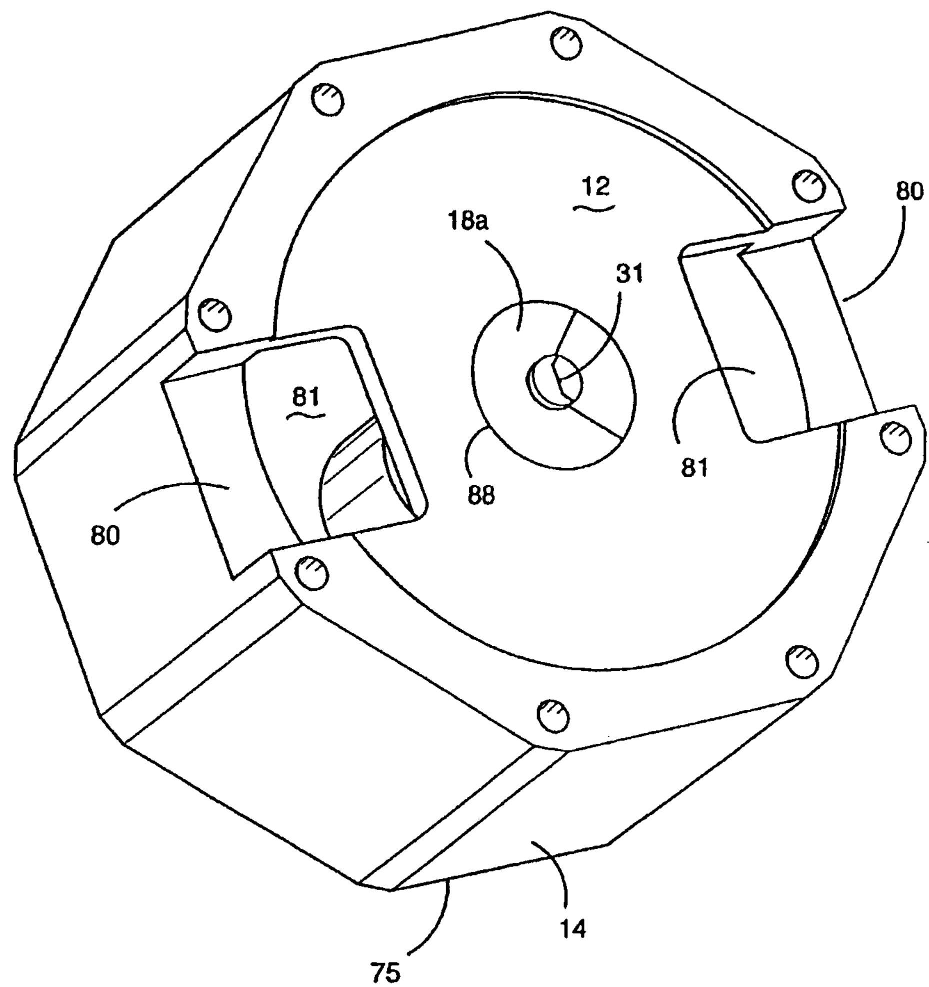
FIG. 12 is a perspective view of the mounting of FIG. 10 from beneath.
Figure 13:
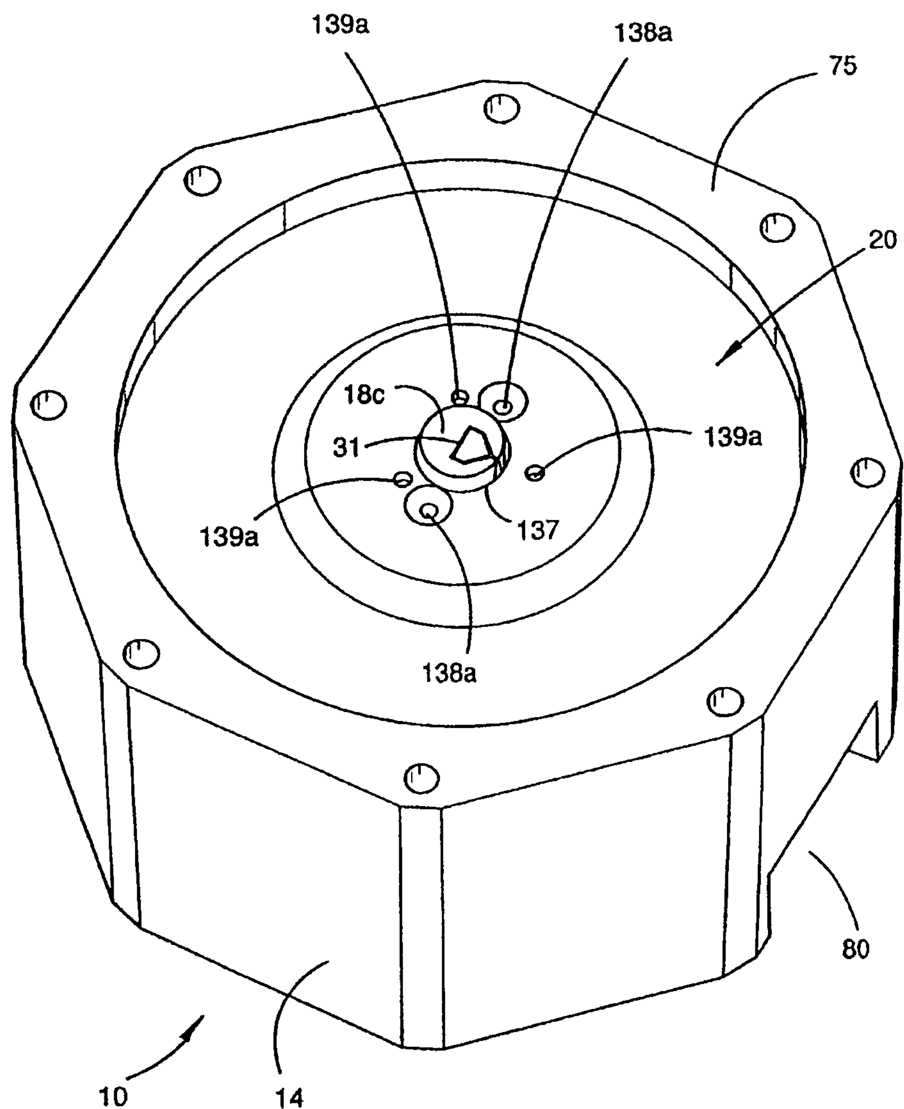
FIG. 13 is a perspective view of the mounting of FIG. 10 including a second mount of the second embodiment.

As is apparent from FIGS. 10, 12 and 13, the first mount 10 is octagonal in shape rather than round, as in the previous embodiment.

Figure 14:
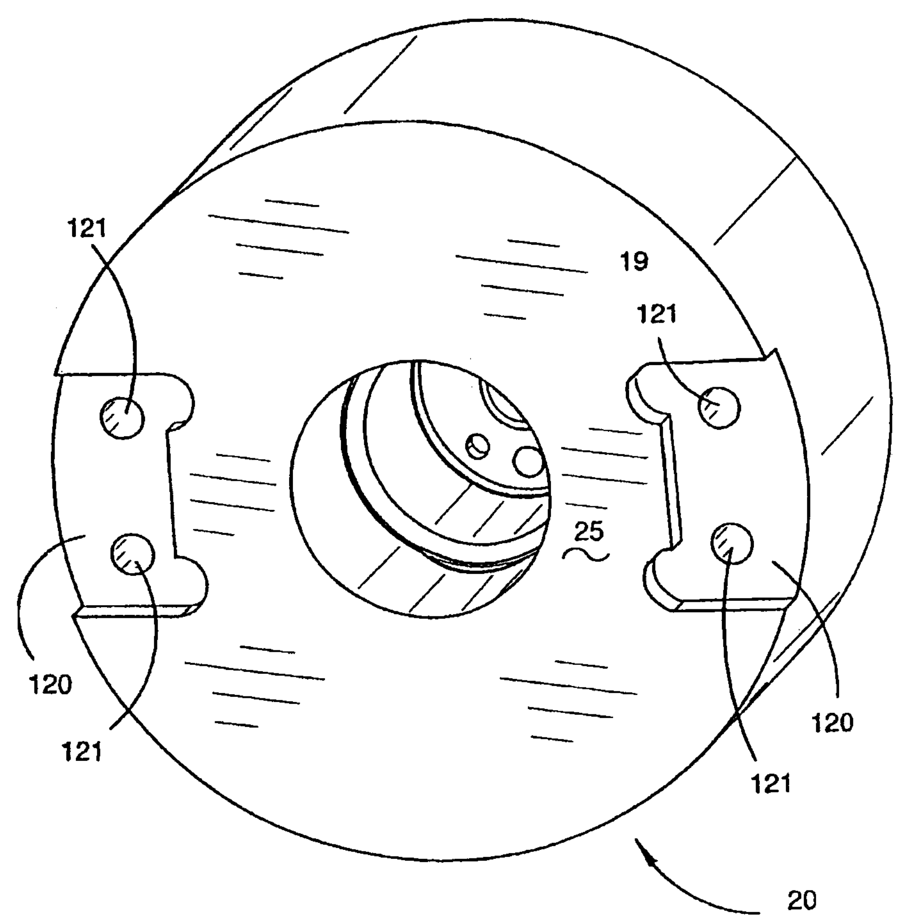
FIG. 14 is a perspective view of a second mount component.

FIG. 14 shows a component of the second mount 20 for mounting in the first mount 10. As is best shown in FIGS. 14 and 15, the second mount 20 has cut-outs 120 which register with the cut-outs 80 for receiving lugs (not shown). The lugs can bolt to the second mount 20 by bolts which pass through the lugs and into bolt holes 121. The lugs (not shown) are mounted to the mount 20 before the mount 20 is secured to the first mount 10.

In this embodiment, top wall 24 is provided with a central hole 137 and two attachment holes 138*a*. Three smaller holes 139*a* are provided to facilitate pushing of the first housing portion 45 off the part 18*a* if disassembly is required. When the second mount 20 is located within the first mount 10, the upper part of central section 18*c* projects through the hole 137, as best shown in FIG. 13. The mount 20 can then be connected to the mount 10 by fasteners which pass through the holes 138 and engage in holes 139*b* (see FIG. 10) in the part 18*a*.

Thus, when the first housing portion 45 and its associated sensor mass 41 is connected to the rim 75 of the first mount 10 and the second housing portion 47 is connected to the base 12, flexure web 31 allows movement of the housing portions 45 and 47 about the z-axis.

Consequently, when the second mount 20 is fixed to the part 18*a*, the second mount 20 can pivot with the first portion 10*a* of the first mount 10 about a z-axis defined by the flexure web 31 whilst the second portion formed by the part 18*a* remains stationary.

FIG. 16 shows main body 61 of the housing 1 and connectors 69 with the hemispherical ends removed.

Figure 17:
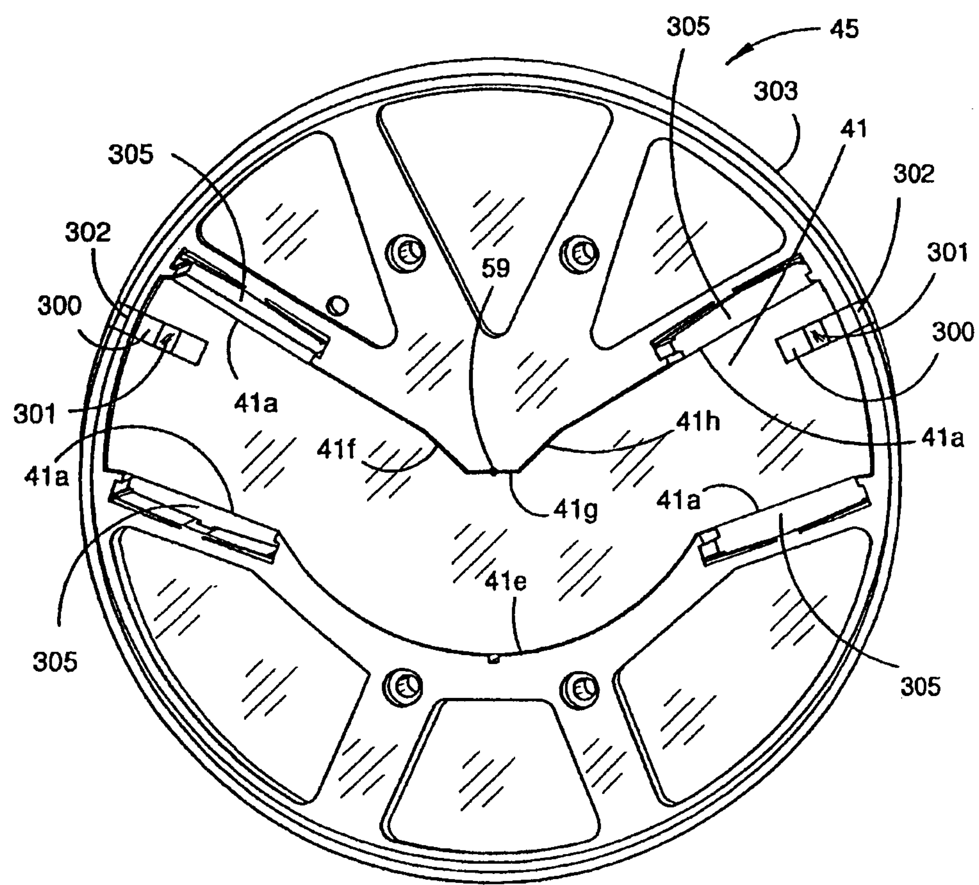
FIG. 17 is a plan view of a housing portion for supporting a sensor mass according to a further embodiment of the invention.

FIG. 17 is a plan view of the first housing portion 45 according to a still further embodiment of the invention. As is apparent from FIG. 17, the first housing portion 45 is circular rather than octagonal, as is the case with the embodiment of FIG. 6.

The first housing portion 45 supports sensor mass 41 in the same manner as described via flexure web 59 which is located at the centre of mass of the sensor mass 41. The sensor mass 41 is of chevron shape, although the chevron shape is slightly different to that in the earlier embodiments and has a more rounded edge 41*e* opposite flexure web 59 and a trough-shaped wall section 41*f*, 41*g* and 41*h* adjacent the flexure web 59. The ends of the sensor mass 41 have screw-threaded bores 300 which receive screw-threaded members 301 which may be in the form of plugs such as grub screws or the like. The bores 300 register with holes 302 in the peripheral wall 52*a* of the first housing portion 45. The holes 302 enable access to the plugs 301 by a screwdriver or other tool so that the plugs 301 can be screwed into and out of the bore 300 to adjust their position in the bore to balance the sensor ass 41 so the centre of gravity is at the flexure web 59.

As drawn in FIG. 17, the bores 300 are a 45° angle to the horizontal and vertical. Thus, the two bores (302 shown in FIG. 17) are at right angles with respect to one another.

FIG. 17 also shows openings 305 for receiving a portion of the transducers 71 for monitoring the movement of the sensor mass 41 and producing signals in response to the movement. Typically, each transducer 71 is in the form of a constant charge capacitor. One capacitor plate typically is mounted to the sensor mass 41 and another capacitor plate is stationary relative to the sensor mass 41 so that a gap is defined between the capacitor plates. Movement of the sensor mass changes the gap which in turn changes a voltage across the constant charge capacitor.

Figure 18:
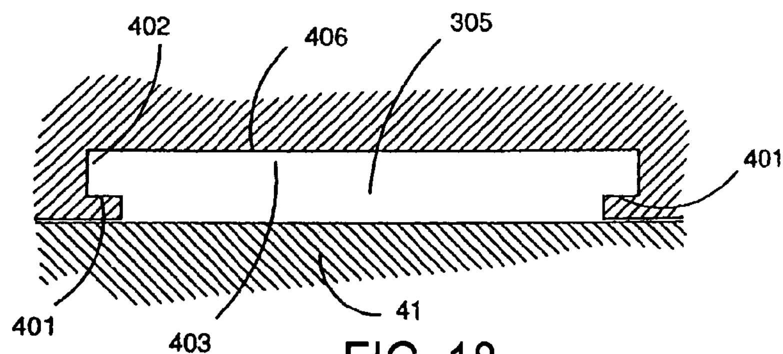
FIG. 18 shows a component of the gravity gradiometer according to an embodiment of the present invention.

FIG. 18 is a more detailed view of part of the housing portion of FIG. 17 showing the openings 305. As can be seen from FIG. 18, the openings 305 have shoulders 401 which form grooves 402.

Figure 19:
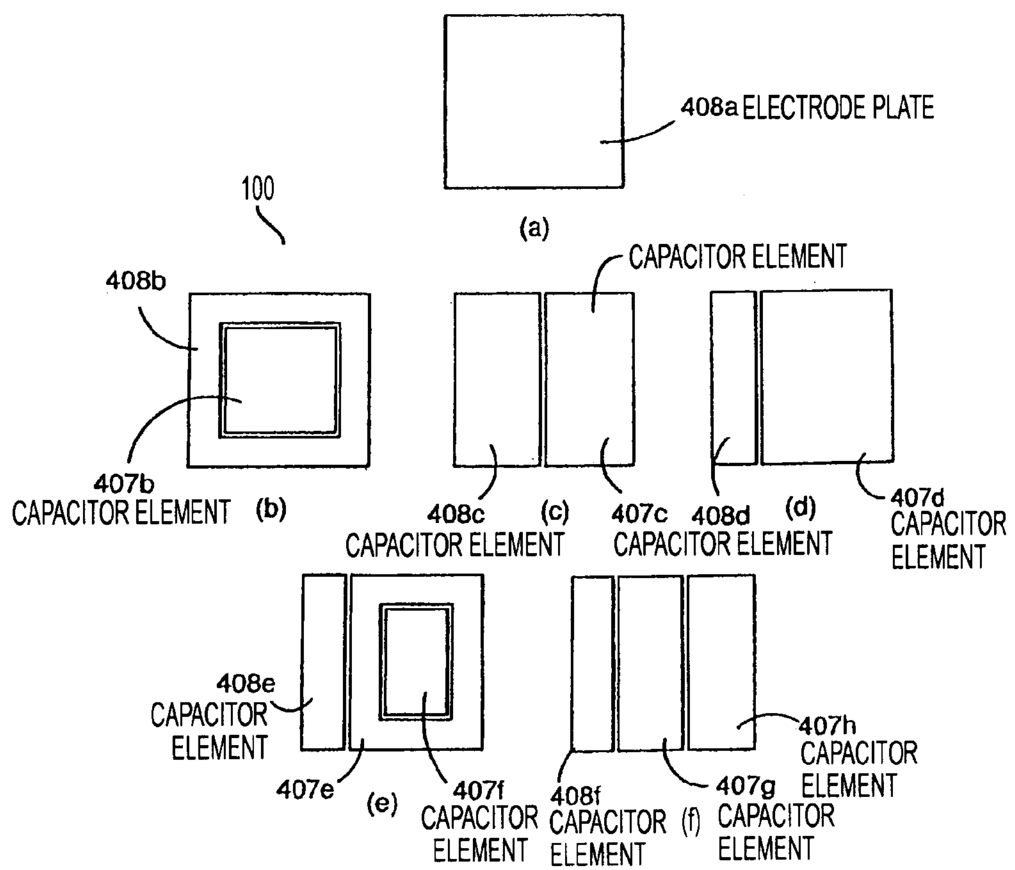
FIG. 19 (*a*)-(*f*) is a view of transducer elements according to a specific embodiment of the present invention.

FIG. 19 (*a*) to (*f*) show portions of the constant charge capacitor transducers 71. The transducer shown in FIG. 19(*a*) comprises two electrodes. A first electrode is in this embodiment provided by a surface of the sensor masses 41 or 42, which are at ground potential, and a second electrode is shown in FIG. 19 (*a*) (plate 408 *a*).

FIG. 19 (*b*) shows the second capacitor electrode which comprises two separate capacitor elements 408*b* and 407*b* which are not in electrical contact. Again, the first electrode is provided by the sensor masses 41 or 42, which are at ground potential. The capacitor element 408*b* surrounds the capacitor element 407*b*. This arrangement is used for generating a "virtual capacitor", which will be described below with reference to FIG. 22.

FIGS. 19 (*c*) and (*d*) show alternatives to the embodiment shown in FIG. 19 (*b*) and the shown second electrodes comprise adjacent elements 408*c*, 407*c* and 408*d* and 407*d* respectively.

FIGS. 19 (*e*) and (*f*) show capacitor elements according to further embodiments of the present invention. The second electrode comprises three capacitor elements 408*e*, 407*e*, 407*f* and 408*f*, 407*g* and 407*h*, respectively, and this arrangement is also used for generating a "virtual capacitor which will be described below.

It will be appreciated, that in variation of this embodiment the capacitor plates may have any other suitable cross-sectional shape.

Figure 20:
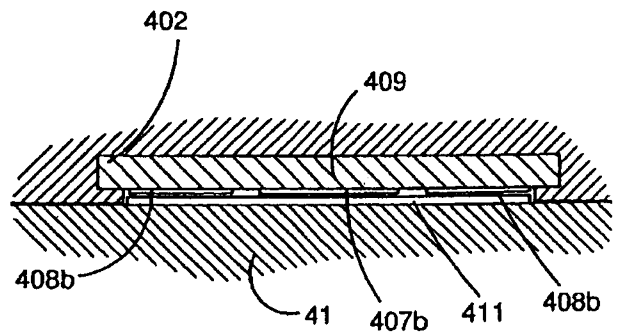
FIG. 20 is a view similar to FIG. 18 but showing one of the transducers elements of FIG. 19 in place.

As an example, FIG. 20 shows the location of the capacitor elements 407*b* and 408*b* in the opening 305 and opposite a corresponding second capacitor plate 411. In this embodiment the capacitor elements 407*b* and 408*b* are provided in the form of metallic foils that are positioned on insulating body 409. The plate 411 is metallic and positioned on the sensor mass 41. In this embodiment plate 411 provides one capacitor element that opposes capacitor elements 407 *b* and 408 *b*. In this case the sensor mass 41 may be of relatively low electrical conductivity or may be electrically insulating.

If the sensor mass 41 is provided in the form of a metallic material of sufficiently high electrical conductivity, the sensor mass 41 may also provide a capacitor element and a portion of the sensor mass 41 may directly oppose the capacitor elements 407*b* and 408*b* without the plate 411, as discussed above in the context of FIG. 17.

Figure 21:
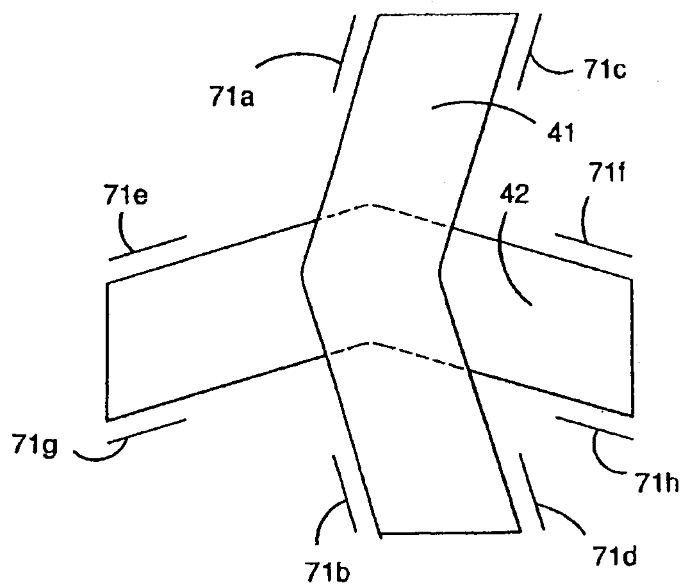
FIG. 21 is a diagram to assist explanation of the circuits of FIG. 22.
Figure 22A:
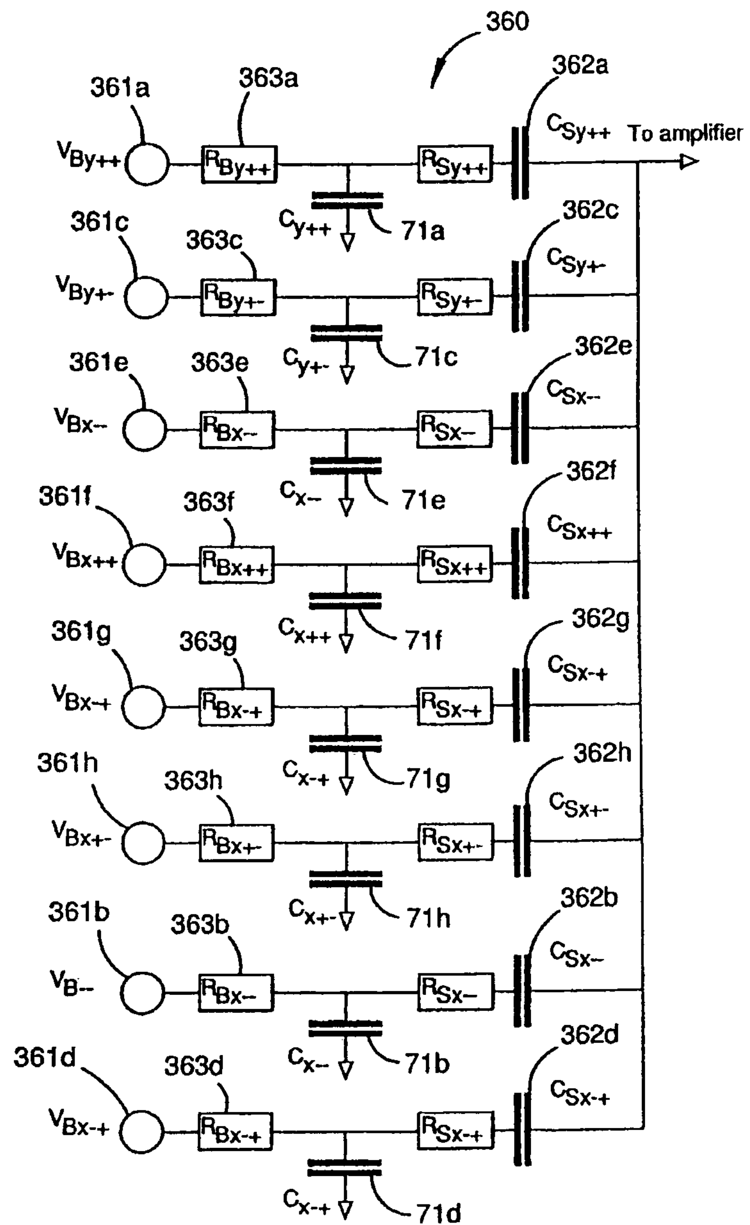
FIG. 22 (*a*)-(*d*) are circuit diagram relating to a specific embodiments of the invention.
Figure 22B:
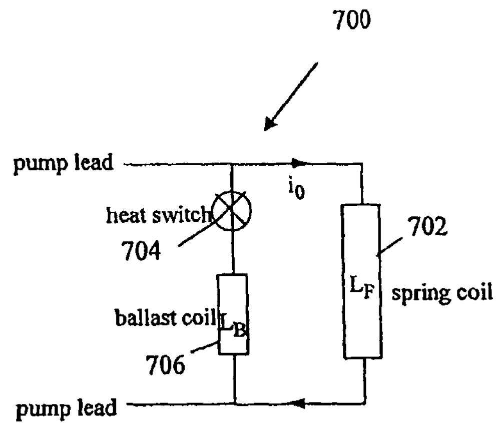
Figure 22C:
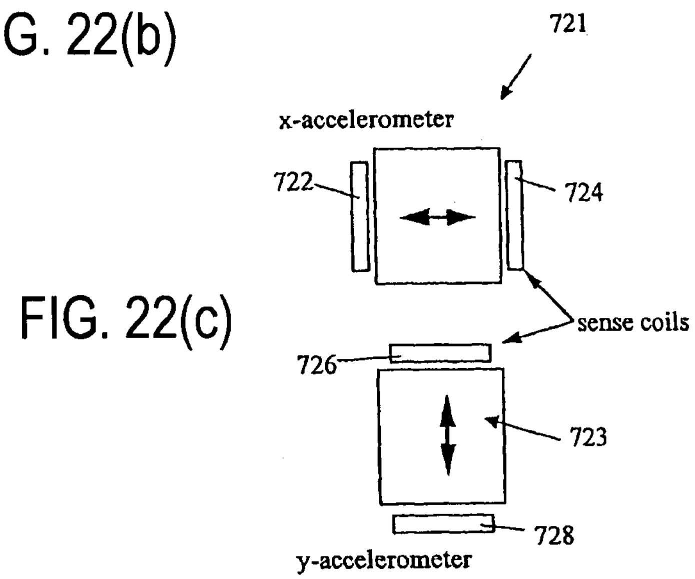
Figure 22D:
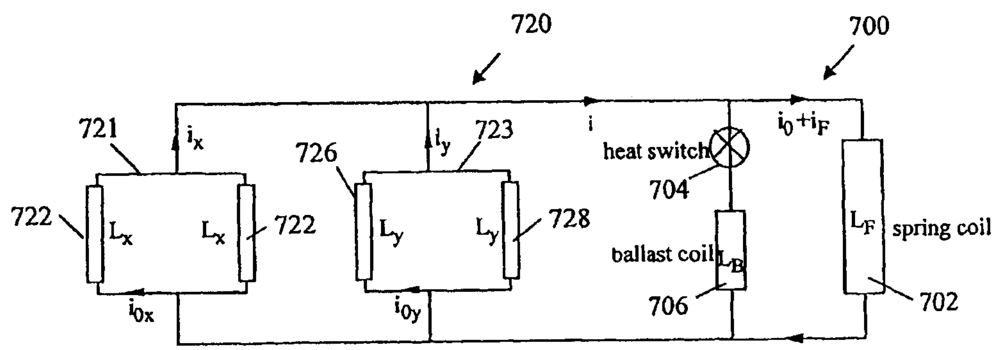

FIG. 21 is a diagram of the sensor masses 41 and 42 showing them in their "in use" configuration. The transducers which are located in the openings 305 are shown by reference numbers 71*a* to 71*e*.

As will be apparent from FIG. 21, four transducers 71 are arranged adjacent the ends of the sensor mass 41. The second housing portion 47 also has four transducers arranged adjacent the sensor mass 42. Thus, eight transducers 71 are provided in the gradiometer.

Referring now to FIGS. 22 and 23 transducer circuitry 360 is now described. Each of the transducers 71*a* to 71*e* is a constant charge capacitor and comprises a first capacitor electrode. Each of the transducers 71*a* to 71*e* has a second capacitor electrode that is positioned opposite a respective first capacitor electrode and fixed in position relative to the housing portions. The first capacitor electrode is in this embodiment provided by a surface the sensor masses 41 or 42. For example, each transducer 71*a*-71*e* may have a second electrode of the type as shown in FIG. 19.

Oscillating movement of the sensor masses 41 and 42 results in a movement of the first capacitor electrodes (surfaces of the sensor masses 41 or 42) relative to the second capacitor electrodes. That movement changes the gaps between respective first and second capacitor electrodes and results in a voltage change across the constant charge capacitor transducers 71*a* to 71*e*.

If the transducers are of the type as shown in FIG. 19 (*b*) to 20 (*d*), then separate component transducers are formed between the first electrode and each capacitor element of the second electrode, such as 407*b* and 408*b*. In this case FIG. 22 shows the transducer circuitry for the component transducers formed between the first plate and one of the two elements and an analogous circuitry (labeled accordingly) is used for the component transducers formed between the first electrode and the other capacitor elements.

If the transducers are of the type as shown in FIGS. 19 (*e*) and 19 (*f*), then separate component transducers are formed between the first electrode and each of the three capacitor elements, such as 408*e*, 408*e* and 407*f*. FIG. 22 shows the transducer circuitry for the component transducers formed between the first electrode and one of the three elements and two analogous circuitries (labeled accordingly) are used for the component transducers formed between the first plate and the other capacitor elements.

Each constant charge capacitor component transducer 71*a* to 71*e* has a separate bias voltage by a respective bias voltage source $V_{B\alpha\beta\gamma}$ applied to it. FIG. 22 shows component transducer 71*a* to 71*e* with one of the capacitor elements being connected to ground potential. As discussed above, these capacitor elements are surfaces of the sensor masses 41 and 42, which are in this embodiment electrically conductive and connected to ground potential. The polarities of the voltages provided by the bias voltage sources 361*a* to 361*e* and the electrical interconnections between the constant charge capacitor component transducers 71*a* to 71*e* are chosen so that the electrical signals generated by all transducers are combined with the same polarity if the sensor masses 41 and 42 oscillate in opposite directions. Such oscillation in opposite directions typically is generated by a gravity gradient if the sensor masses are balanced and have identical mechanical properties. If the sensor masses 41 and 42 move in the same direction, one half of the electrical signals generated by the constant charge capacitors component transducers 71*a* to 71*e* has one polarity and the other half has an opposite polarity. Consequently, in this case, the electrical signals typically cancel each other. Such movement in the same direction may for example be generated by a sudden movement of the aircraft in which the gravity gradiometer is positioned and consequently the transducer circuitry 360 illustrated in FIG. 22 reduces the effect of such sudden movements and the effect of a number of other external forces or external angular accelerations that are not related to the gravity gradient.

The combined electrical signal is directed to a low noise amplifier which will be described in the context of FIG. 23.

The transducer circuitry 360 shown in FIG. 22 also comprises locking capacitors $C_{S\alpha\beta\gamma}$ which are arranged so that the applied bias voltages $V_{B\alpha\beta\gamma}$ cannot reach the lower noise amplifier. The locking capacitors 362*a* to 362*e* typically have a capacitance that is larger than 10 times, or even larger than 100 times that of the respective constant charge capacitor component transducers 71*a* to 71*e*.

Further, the transducer circuitry 360 comprises resistors $R_{B\alpha\beta\gamma}$ 363*a* to 363*e*. These resistors typically have a very high resistance, such as 1 GΩ or more, and are arranged for substantially preventing flow of charges and thereby providing for the component transducers 71*a* to 71*e* to operate as constant charge capacitors.

The bias voltages applied to the constant charge capacitors generate electrostatic forces. Consequently, each transducer 71*a* to 71*e* can also function as an actuator.

If the transducers 71 are of the type as shown in FIG. 19(*a*), then the circuitry 360 shown in FIG. 22 is sufficient. However in a specific embodiment of the present invention the transducers are of the type as shown in FIGS. 19 (*b*) to 19(*d*) and comprise two component transducers. In this case two circuitries 360 are used, one for the component transducers formed between the first electrodes and one of the capacitor elements, and the other for the component transducers formed between the first electrodes and the other capacitor elements. This is schematically indicated in FIG. 25. A first circuitry 360 is used for measurement purposes (differential mode, "DM") and a second circuitry 360 is used to provide feedback for external rotational motion correction (common mode, "CM"), which will be described below with reference to FIGS. 28 and 29.

Alternatively, the circuitries 360 may also be connected so that "virtual capacitors" are formed. This will be described below in more detail and is schematically indicated in FIG. 24.

In another specific embodiment of the present invention the transducers are of the type as shown in FIGS. 19 (*e*) or 19 (*f*) and comprise three component transducers. In this case three circuitries 360 are used. This is schematically indicated in FIG. 26. In this embodiment two circuitries 360 are used for measurement purposes and arranged so that "virtual capacitors" are formed. A third circuitry 360 is used to provide feedback for external rotational motion correction.

The following will describe how relative mechanical properties of the sensor masses 41 and 42 can be tuned. The resonance frequencies of the sensor masses 41 and 42 depend on the square of the electrostatic forces and therefore the square of the applied bias voltage. For example, the resonance frequencies may be tuned using a mechanical test set up in which external forces are applied to the sensor masses 41 and 42. If the resonance frequencies are not identical, the bias voltages can be adjusted until the resonance frequencies are identical.

The sensitivities of the transducer capacitors for sensing the movement of the sensor masses is linearly dependent on the electrostatic forces and thereby linearly dependent on the applied bias voltages. Consequently, it is possible to tune both the resonance frequencies and the sensitivities of the transducers.

As described above, the sensor masses 41 and 42 are arranged so that a movement of the sensor masses 41 and 42 relative to each other is indicative of a change in gravity gradient. An external acceleration, such as an external angular acceleration about the z-axis does not result in a movement of the sensor masses relative to each other as long as the sensor masses are identical. The sensor masses 41 and 42 and their respective flexure webs are mechanically arranged so that their moment of inertia are sufficiently similar, and the transducers 71 are adjusted so that their sensitivities are sufficiently similar, so that an impact of an external angular acceleration is reduced by a factor of $10^3$ to $10^4$. As a consequence the sensor masses 41 and 42 are formed as discussed above to have nearly identical resonance frequencies to within 1 part in $10^3$, typically within 1 part in $10^4$. An impact of an external angular acceleration is further reduced using feed-back and feed-forward arrangements. The feed-back and feed-forward like arrangements, which will be described with reference to FIGS. 29 and 30, result in a reduction of an influence of an external angular acceleration by a factor of approximately $10^3$-$10^4$.

Further, the sensor masses 41 and 42 are mechanically balanced so that a distance between a centre of mass and the axis of rotation is less than one part in $10^6$, typically 1 part in $10^7$ of a radius of gyration of the sensor mass, which requires a high level of mechanical precision.

Each sensor mass 41 and 42 may have a small remaining imbalance (may be by a distance of the order of one or more $10^{-9}$ m) from the axis about which the sensor masses 41 and 42 are arranged to rotate. Such a "mass dipole moment" imbalance, which results in a residual influence of an external linear acceleration, is taken into account in the following manner.

A feed-forward loop is formed by components including the transducer sensors 71, an acceleration sensor ((not shown, but similar to acceleration sensors 721 and 723 shown in FIG. 22(*c*)) such as an additional capacitance sensor, and control electronics. The acceleration sensor is positioned at a fixed position relative to a housing portion 45 or 47 and, when an external linear acceleration is sensed, provides a voltage to a controller (not shown). The controller then causes the transducer sensors 71 to generate a suitable adjustment force that is aimed to counteract a difference in torque that the sensor masses 41 and 42 would experience as a consequence of the external linear acceleration. For this purpose a mechanical response parameter is required that is a measure for a ratio of an external linear acceleration and a corresponding adjustment force required to counteract a torque resulting from the external linear acceleration. Consequently, the mechanical response parameter is dependent on the mass dipole moment of the sensor masses 41 and 42 and the spring constants of the respective flexure webs. The mechanical response parameter is determined experimentally by exposing the sensor masses 41 and 42 in their respective housings to a linear acceleration and then determining a force that is required to compensate for a difference in torque that the sensor masses 41 and 42 would otherwise experience as a consequence of the external linear acceleration. As the sensor masses 41 and 42 are arranged for movement in the x, y-plane such an imbalance only needs to be considered for acceleration within that plane.

In the embodiment described above the transducer sensors 71 are provided in the form of capacitors that also function as actuators. It is to be appreciated that in an alternative embodiment the gravity gradiometer 1 may also comprise suitable inductive coils that replace the capacitors 71 and have corresponding sensing and actuating functions. The gravity gradiometer in accordance with the alternative embodiment comprises electronic components that accommodate the function of the inductive coils as sensors and actuators. PCT international application number PCT/AU2006/001269 discloses a gravity gradiometer having inductive coils for sensing a relative motion of sensor masses. The gravity gradiometer disclosed in PCT/AU2006/001269 is cooled using cooling liquid helium and the inductive coils are superconducting devices. The following will describe how the gravity gradiometer disclosed in PCT/AU2006/001269 can be adapted to account for the above-described "mass dipole moment" imbalance.

The PCT international application no. PCT/AU2006/001269 discloses coil arrangements ("sense coils") that are used for sensing a motion of the sensor bars and coil arrangements ("spring coils") that are used for tuning mechanical properties of the sensor bars. Anyone of the spring coils may be replaced by a circuitry as shown in FIG. 22 (*b*).

The superconducting circuitry 700 comprises a spring coil 702 that has inductance LF and in use carries a static persistent current i0 which flows through a heat switch 704 and a ballast inductor 706. The heat switch 704 is used to initially establish the current i0, whose magnitude is chosen to provide frequency tuning for the respective sensor mass. Because i0 is persistent, no current needs to flow in the pump leads (except initially to establish i0). The spring coil 702 is typically a thin film and the ballast coil 706, which has an inductance much smaller than that of the spring coil 702, is either a small thin film coil on the back of the spring coil or may simply consist of the stray inductance associated with the heat switch 704 and its leads.

The current i0 produces a static force. An external current i that is passed into the pump leads is splits proportionally to flow through both LF and LB so that the force can be modified that is generated by the current in trough the spring coil 702.

FIG. 22 (*c*) shows x- and y linear accelerometers 721 and 723, respectively. The accelerometers 721 and 723 comprise coils 722, 724 and 726, 728, respectively and generate currents ix and iy that are proportional to the linear acceleration of sensor masses positioned between pairs of the coils.

The generated currents ix and iy are directed to the above-described inductive coil circuitry 700 so that a force is generated by the spring coil 702 that is dependent on the currents generated by the accelerometers 721 and 723. FIG. 22 (*d*) shows a circuit diagram 720 that illustrates how currents may be injected into the spring coil 702.

The following will describe further details of electronic circuitry used in the gravity gradiometer 1.

FIG. 23 shows a schematic circuit diagram of a low noise amplifier according to a specific embodiment of the present invention. The low noise amplifier circuitry 366 is used to amplify the electrical signal generated by the transducer circuit 360 and to provide active feedback to control properties of the transducers and sensor masses 41 and 42.

The amplifier circuit 366 simulates an impedance $Z_L$ and an ohmic component of $Z_L$ provides active damping of resonant electrical signals generated by the constant charge capacitor component transducers 71*a* to 71*e* described above. The active damping reduces the Q-factor of the resonance and thereby increases the bandwidth within which the resonance can be generated. That electrical damping results in mechanical damping by generating electrostatic damping forces at the constant charge capacitor component transducers 71*a*-71*e*. Typically, the active damping is adjusted so that the gravity gradiometer has a bandwidth of the order of 1 Hz and the Q-factor of the active damping is close to 0.5.

The impedance $Z_L$ also has an imaginary component, which is dependent on a simulated capacitance $C_L$ in parallel with the simulated resistor $R_L$. The imaginary component actively controls the resonance frequency of the sensor masses 41 and 42 via the constant charge capacitor transducers 71*a*-71*e* by simulating a change of the "stiffness" of the pivotal coupling of the sensor masses 41 and 42 and thereby fine-tunes the resonance frequency of the sensor masses 41 and 42. As described above, the transducer circuit 360 is arranged so that resonant oscillations in which the sensor masses 41 and 42 oscillate in opposite directions result in an additive electrical signal. The simulated capacitance $C_L$ of the simulated impedance $Z_L$ allows fine tuning of the resonance and thereby further helps distinguishing that resonance oscillation from other common mode oscillations in which the sensor masses 41 and 42 oscillate in the same direction.

In this embodiment the amplifier circuit 366 provides "cold damping", which introduces very little thermal noise. Passive damping, such as damping using a conventional resistor, is avoided as this would result in thermal noise.

As described above, the constant charge component capacitors 71*a*-71*e* may combine sensing and actuator functions. The amplifier circuit 366 provides an active feedback loop between sensing and actuator functions and provides electronic feedback control of mechanical properties of the sensor masses 41 and 42.

The amplifier circuit 366 comprises an input 368 and an output 369. Further, the amplifier circuit 366 comprises a low-noise j-FET differential amplifier 370 and impedances Z1, Z2 and Z3. The low noise amplifier 370 has two input terminals 371 and 372 and the impedance $Z_1$ is connected between the output terminal 369 and the low noise amplifier input 371. The impedance $Z_2$ is connected between the output terminal 369 and the low noise amplifier input 372. The impedance $Z_3$ is connected between the terminal 372 and a common ground terminal 373.

The amplifier circuit 366 simulates the impedance $Z_L$ with $$Z_L \approx -\frac{Z_1 Z_3}{Z_2}. \quad \text{(eq. 1)}$$

The amplifier 370 has noise matched resistance $$R_{opt} = \sqrt{\frac{S_V}{S_i}}.$$

The term $S_V$ is the spectral density of amplifier's voltage noise and the term $S_i$ is the spectral density of amplifier's current noise. In this embodiment the amplifiers noise matched resistance is a few 1 MΩ.

Further, the amplifier 370 has a noise temperature $$S_\Gamma = \frac{4k_B T_{opt} 2\pi f_0}{m\lambda^2 Q_{act}} \quad \text{(eq. 2)}$$

($k_B$: Bolzman constant) of less than 1K.

The noise density $S_\Gamma$ of the gradient error produced by thermal noise near resonance is given by $$T_{opt} = \frac{\sqrt{S_V S_i}}{2k_B}$$

where λ is the radius of the gyration of the sensor masses 41 and 42 and $Q_{act}$ the effective Q-factor associated with the active damping, M is the mass of the sensor masses 41 and 42 and $f_o$ is the resonance frequency. The noise density $S_\Gamma$ is dependent on the noise of the amplifier and not on the physical temperature of the amplifier circuit, which allows "cold damping" and control of other mechanical properties without introducing significant thermal noise at normal operation temperatures such as at room temperature.

The component transducers 71*a*, 71*b*, 71*g* and 71*h* are also used to form angular accelerometers for measuring the angular movement of the mounting 5 so that feedback signals can be provided to compensate for that angular movement.

Figure 27:
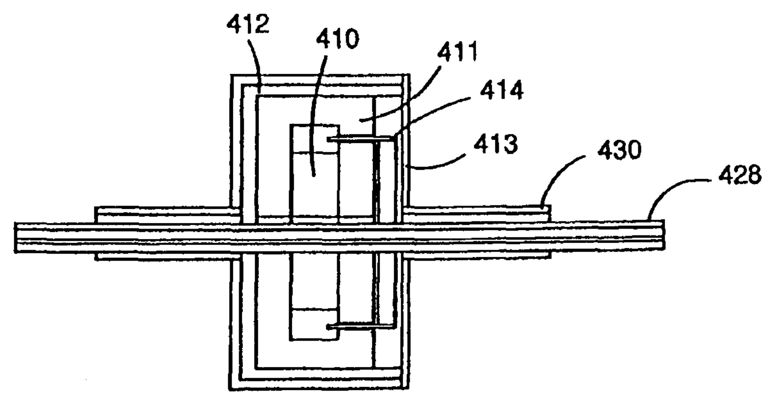
FIG. 27 is a cross-sectional perspective view through an actuator according to a specific embodiment of the invention.

FIG. 27 shows an actuator for receiving the control signals to adjust the mounting in response to angular movement of the mounting 5.

The actuator shown in FIG. 27 is also schematically shown in FIG. 8 by reference to numerals 53 and 54. The actuators are the same and FIG. 28 will be described with reference to the actuator 54.

The actuator 54 comprises in this embodiment a permanent NdFeB magnet 410, a soft iron core 411, a non-magnetic spacer 412 (aluminium, delrin), mumetal or permalloy housing 413, a voice coil assembly 414, a hollow rod 428 and a tube 430 that forms part of the housing 413 and in which the hollow rod 428 is rotatably mounted.

The voice coil assembly 414 is mounted onto rod 430 and the permanent magnet 410 and the soft iron core 411 are provided with internal bores through which the rod 430 penetrates so that the rod 430 with voice coil assembly 414 can move axially relative to the iron core 311 and the magnet 410. Electrical connections for the voice coil assembly 414 are fed through the hollow rod 430.

As described above, one or both of the sensor masses 41 and 42 can also be used as an angular accelerometer to provide a measure of angular movement of the mounting 5 so that appropriate feedback signals can be generated to compensation for that movement by control of the actuators previously described.

Figure 28:
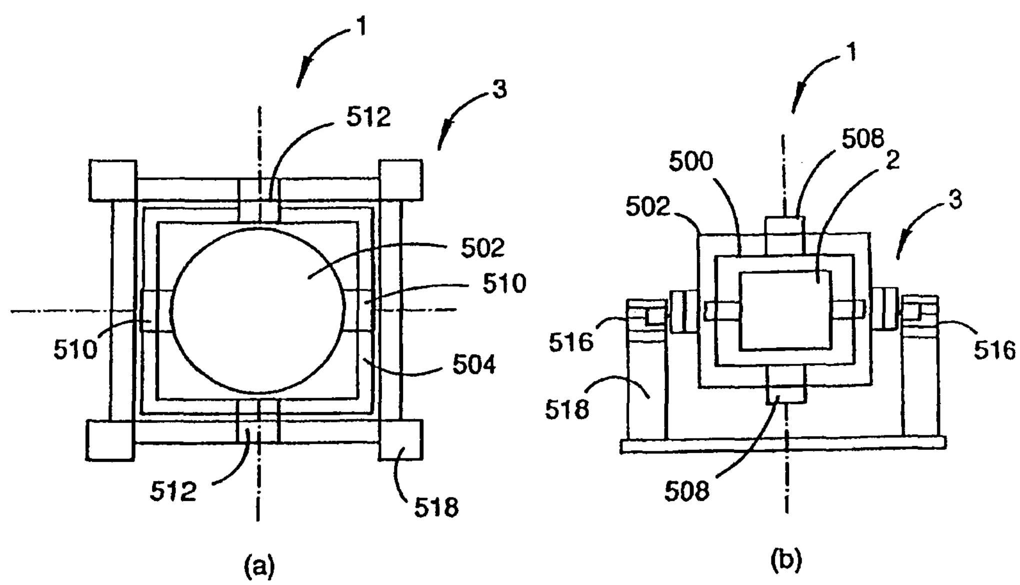
FIGS. 28 (*a*) and (*b*) shows components of the gravity gradiometer according to a specific embodiment of the present invention.

FIGS. 28 (*a*) and (*b*) show schematic plan and cross-sectional view of the gravity gradiometer 1. As indicated previously, the gravity gradiometer 1 comprises a housing 2 that is rotated by an external mounting about a z-axis. The external platform 3 comprises an inner stage 500 and an intermediate stage 502 and an outer stage 504. The housing 2 is mounted so that it is rotated with the inner stage 500 by z-drive 508 with bearings. The z-drive provides continuous rotation at a very stable speed. The rotational frequency is in this embodiment selectable between 0 and 20 Hz. The intermediate stage 502 including the inner stage 500 is rotable about the x-axis by x-drive 510, which includes bearings and the outer stage 504 is rotable with the intermediate stage 502 about the y-axis by y-axis drive 512 which also include suitable bearings. The outer stage with y-axis drive is mounted on springs 516 in a support frame 518.

The external platform 3 includes an IMU (inertial measurement unit), which contains gyroscopes, accelerometers, GPS receivers and a computer. The IMU is not shown in FIG. 28 (*a*) or (*b*). The IMU measures rotation about the x-, y- and z-axis and is coupled to drives in a feedback loop. This will be described below in more detail with reference to FIG. 29.

The external platform is arranged to gyro-stabilize the housing 2 about the x-, y- and z-axis with a gain factor of approximately 100 DC and a bandwidth of 20 Hz. This is achieved using the above-described 3-axis "gimbal" bearing arrangement with direct drive torque motors (508, 510 and 512). In this embodiment, fine-tuning of the motor drive for correction of rotation about the z-axis is achieved using the "common mode" signal provided by respective transducer components positioned within the housing 2.

Figure 29:
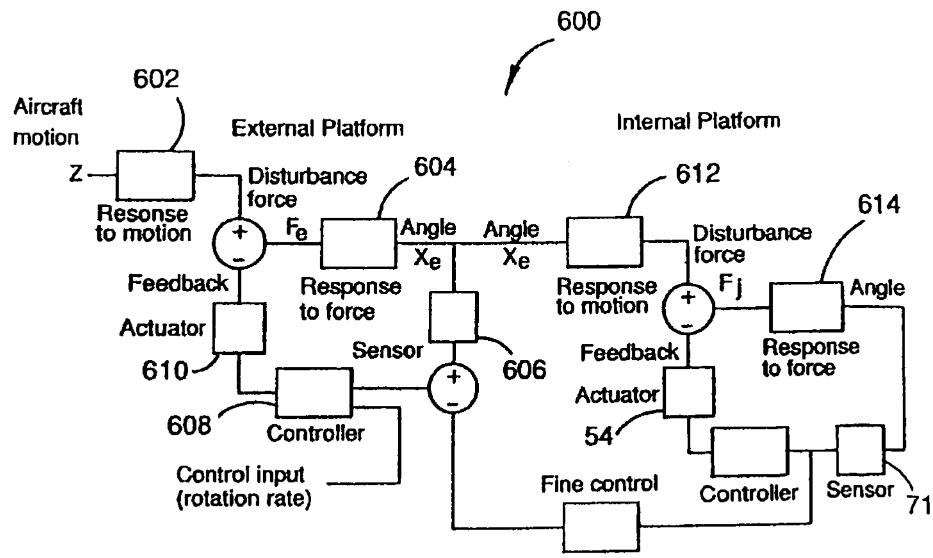
FIGS. 29 and 30 show block diagrams illustrating the operation of a rotatable support system according to a specific embodiment of the present invention.

FIG. 29 shows a block diagram 600 that illustrates how the common mode signal, generated within the housing 2 (which comprises the internal platform), is used for rotational z-axis correction of the external platform.

Blocks 602 and 604, labelled "response to motion" and "response to force" respectively, both represent the gimbal structure of the support structure 3. Each gimbal consists of three main components, namely a frame, a part supported by the frame via a bearing and an actuator which applies a torque (force) to this part. Each gimbal has two independent inputs, namely motion applied to the frame and a force applied directly to the part suspended by the frame. It has only one output, namely the angular position of the supported part and this responds differently to the two inputs.

Feedback force $F_e$ counteracts an external disturbance Z. This may be expressed by the following equation $$X_e = H_f F_e + H_z Z \quad \text{(eq. 3)}$$

where $H_f$ and $H_z$ are constants.

Equation 3 may be written as $$X_e = H_f(F_e + K_e Z) \quad \text{(eq. 4)}$$

where $K_e = H_z/H_f$.

An external motion, such as a motion of an aircraft in which the gravity gradiometer 1 is positioned, produces an equivalent force $K_e$ Z, which is counteracted by $F_e$ generated by the actuator 610. In FIG. 29 block 602 "Response to motion" represents $K_e$ and block 604 "Response to force" represents $H_e$. The sensor 606 for the external platform is the IMU, which contains gyroscopes, accelerometers, GPS receivers and a computer. This provides a signal (usually digital) which measures the angular position and angular rate of the supported part of the innermost gimbal. This signal is used in the controller 608 (also usually digital) to implement the feedback.

The internal platform may be represented in an analogous manner where blocks 612 and 614 labelled "response to motion" and "response to force" respectively, both represent the z-axis gimbal structure within the housing 2. The transducer sensors 71 and the actuator 54 have been described above.

In the above-described embodiment the gravity gradiometer 1 is arranged so that rotation about the z-axis is controlled by the external platform to a fixed uniform rotation speed. The input signal for controlling the motion is provided by the IMU 609 and the sensor 606. However, the IMU 609 and the sensor 606 typically only have limited accuracy at higher frequencies and to improve the z-axis rotational correction further, an angular acceleration derived from the above-described "Common Mode" signal from the internal transducer sensors 71 is used for fine-tuning. As described above, the same signal is also used inside the internal platform in a feedback loop to stabilise the instrument against applied angular acceleration (via the actuator 54). The specification for this internal feedback system is stringent and to ease this requirement, some of the burden is transferred to the external platform in that manner.

Figure 30:
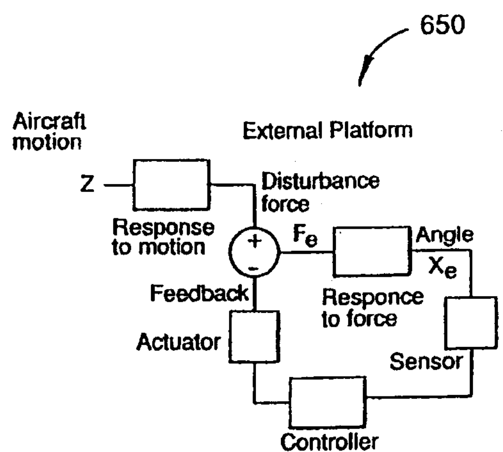

FIG. 30 shows a block diagram 650 that illustrates stabilisation (no rotation) about the x- and y-axis, which is performed exclusively by the external platform. All elements of FIG. 30 were already described above and function in an analogous manner to inhibit rotation about the x- and y-axes.

Although the invention has been described with reference to particular examples, it will be appreciated by those skilled in the art that the invention may be embodied in many other forms. For example, the transducers may not necessarily be provided in the form of constant charge capacitors, but may be provided in the form of any other suitable type of capacitor including those that do not allow simulation of a virtual capacitor. Further, it is to be appreciated that the amplifier circuitry 366 shown in FIG. 24 is only one embodiment and a variety of variations from the described embodiment are possible.

In a variation of the above-described embodiment the gravity gradiometer is not arranged for rotation about the z-axis and the internal platform is arranged so that fine-adjustment of the motion of the sensor masses is conducted about the x, y and z-axes. In this case the gravity gradiometer typically comprises superconducting components and the above-described transducer sensors 71 may be provided in the form of superconducting coils. Such an arrangement is described in detail in the applicant's co-pending in PCT International Application PCT/AU2006/001276.

In addition, the gravity gradiometer may be arranged for measuring other components of the gravity gradient, in which case the gravity gradiometer would not be arranged for operation in the described orientation. For example, the gravity gradiometer may be arranged to measure the $\Gamma_{yz}$ and ($\Gamma_{zz}$-$\Gamma_{yy}$) or $\Gamma_{xz}$ and ($\Gamma_{zz}$-$\Gamma_{yy}$) of the gravity gradient.

The reference that is being made to PCT application number PCT/AU2006/001269 and PCT application number PCT/AU2007/001276 does not constitute an admission that these documents form a part of the common general knowledge in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gravity gradiometer for detecting a gravity gradient, comprising:

at least two sensor masses that are pivotable about respective axes and each of said at least two sensor masses experiences a respective change in torque in response to a change in the gravity gradient whereby the at least two sensor masses move relative to each other in response to the change in the gravity gradient and wherein a signal indicative of the gravity gradient is generated in response to the relative movement of the at least two sensor masses;

an acceleration sensor for sensing a linear acceleration associated with an external acceleration applied to the gravity gradiometer; and an actuator for generating an adjustment force that is dependent on the linear acceleration sensed by the acceleration sensor, the adjustment force being also dependent on a mechanical response parameter associated with at least one of the at least two sensor masses and the adjustment force being applied such that a difference between the magnitudes of the respective torques experienced by the at least two sensor masses, resulting from the external acceleration and in response to the change in the gravity gradient, is reduced.

2. The gravity gradiometer as claimed in claim 1, wherein the mechanical response parameter is dependent on a mechanical responsiveness of the at least one sensor mass to an applied force.

3. The gravity gradiometer as claimed in claim 1, wherein the mechanical response parameter is dependent on a magnitude of a mass dipole moment of the at least one sensor mass.

4. The gravity gradiometer as claimed in claim 1, wherein the actuator and the acceleration sensor form a part of a feed-forward control arrangement for controlling the adjustment force.

5. The gravity gradiometer as claimed in claim 1, wherein the acceleration sensor is arranged to sense a linear acceleration.

6. The gravity gradiometer of claim 5, wherein a flexure web acts as a pivot for the at least two sensor masses.

7. The gravity gradiometer as claimed in claim 6, wherein the centre of mass of each of said at least two sensor masses is located in proximity of the respective axes and wherein at least a portion of the difference between the respective torques experienced by the at least two sensor masses is a consequence of different locations of the centres of mass relative to the respective axes.

8. The method of claim 7, wherein the mechanical response parameter is dependent on a mass dipole moment of the at least one sensor mass.

9. The gravity gradiometer as claimed in claim 1, wherein the mechanical response parameter associated with the at least one of the at least two sensor masses is dependent on a distance between a centre of mass and the respective axis of rotation of the at least one sensor mass.

10. The gravity gradiometer as claimed in claim 9, wherein the centre of mass of each of said at least two sensor masses is located in proximity of the respective axes and wherein at least a portion of the difference between the respective torques experienced by the at least two sensor masses is a consequence of different locations of the centres of mass relative to the respective axes.

11. The gravity gradiometer of claim 9, wherein a flexure web acts as a pivot for the at least two sensor masses.

12. The gravity gradiometer of claim 1, wherein the respective axes are aligned so as to be coaxial.

13. The gravity gradiometer as claimed in claim 1, wherein each of said at least two sensor masses has a centre of mass that is displaced from a respective axis of rotation by a distance that is less than 1 part in $10^6$ of a radius of gyration of the respective sensor mass.

14. The gravity gradiometer as claimed in claim 1, wherein each of said at least two sensor masses has a centre of mass that is displaced from a respective axis of rotation by a distance that is less than 1 part in $5\times10^6$ of a radius of gyration of the respective sensor mass.

15. The gravity gradiometer as claimed in claim 1, wherein each of said at least two sensor masses has a centre of mass that is displaced from a respective axis of rotation by a distance that is less than 1 part in $10^7$ of a radius of gyration of the respective sensor mass.

16. The gravity gradiometer as claimed in claim 1, wherein the adjustment force is applied such that a centre of mass of each of said at least two sensor masses is located within 10 nm of the respective axis.

17. The gravity gradiometer as claimed in claim 1, wherein a centre of mass of each of said at least two sensor masses is located within 5 nm of the respective axis.

18. The gravity gradiometer as claimed in claim 1, wherein the at least two sensor masses are pivotable within one plane and wherein the gravity gradiometer is arranged so that a difference between the respective torques experienced by the at least two sensor masses in response to the change in the gravity gradient is reduced for an acceleration applied in any direction within the plane.

19. The gravity gradiometer as claimed in claim 1, wherein at least a portion of the acceleration sensor is located at a fixed location relative to one of the at least two sensor masses.

20. The gravity gradiometer as claimed in claim 1, further comprising capacitors that are arranged such that the relative movement of the at least two sensor masses generates an electrical signal in the capacitors.

21. The gravity gradiometer as claimed in claim 1, further comprising inductive coils that are arranged such that the relative movement of the at least two sensor masses generates an electrical signal in the inductive coils.

22. The gravity gradiometer as claimed in claim 21, wherein the at least two sensor masses are positioned in a Dewar and wherein the gravity gradiometer further comprises superconducting components that in use operate at cryogenic temperatures.

23. The gravity gradiometer as claimed in claim 1, further comprising a stabilization platform and wherein the acceleration sensor is located on a payload side of the stabilization platform.

24. A method of detecting a gravity gradient using a gravity gradiometer comprising at least two sensor masses that are pivotable about respective axes and each of said at least two sensor masses experiences a respective change in torque in response to a change in the gravity gradient whereby the at least two sensor masses move relative to each other in response to the change in the gravity gradient and generating a signal indicative of the gravity gradient in response to the relative movement of the at least two sensor masses, the method comprising:

determining a mechanical response parameter associated with at least one of the at least two sensor masses;

sensing a linear acceleration associated with an external acceleration applied to the gravity gradiometer;

generating an adjustment force that is applied such that a difference between the magnitudes of the respective torques experienced by the at least two sensor masses, resulting from the external acceleration and in response to the change in the gravity gradient, is reduced, the adjustment force being dependent on the sensed linear acceleration and the determined mechanical response parameter; and detecting and generating the gravity gradient signal.

25. The method of claim 24, wherein the external acceleration is a linear acceleration.

26. The method of claim 24, wherein the mechanical response parameter is dependent on a mass dipole moment of the at least one sensor mass.

* * * * *

UNITED STATES PATENT AND TRADEMARK OFFICE

CERTIFICATE OF CORRECTION

PATENT NO. : 8,650,950 B2
APPLICATION NO. : 13/001996
DATED : February 18, 2014
INVENTOR(S) : Frank Joachim Van Kann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this
Twenty-ninth Day of September, 2015

Michelle K. Lee
*Director of the United States Patent and Trademark Office*